July 9, 1935.  J. E. PADGETT  2,007,304
AUTOMATIC POWER TRANSMITTING MECHANISM
Filed Nov. 21, 1932  5 Sheets-Sheet 1
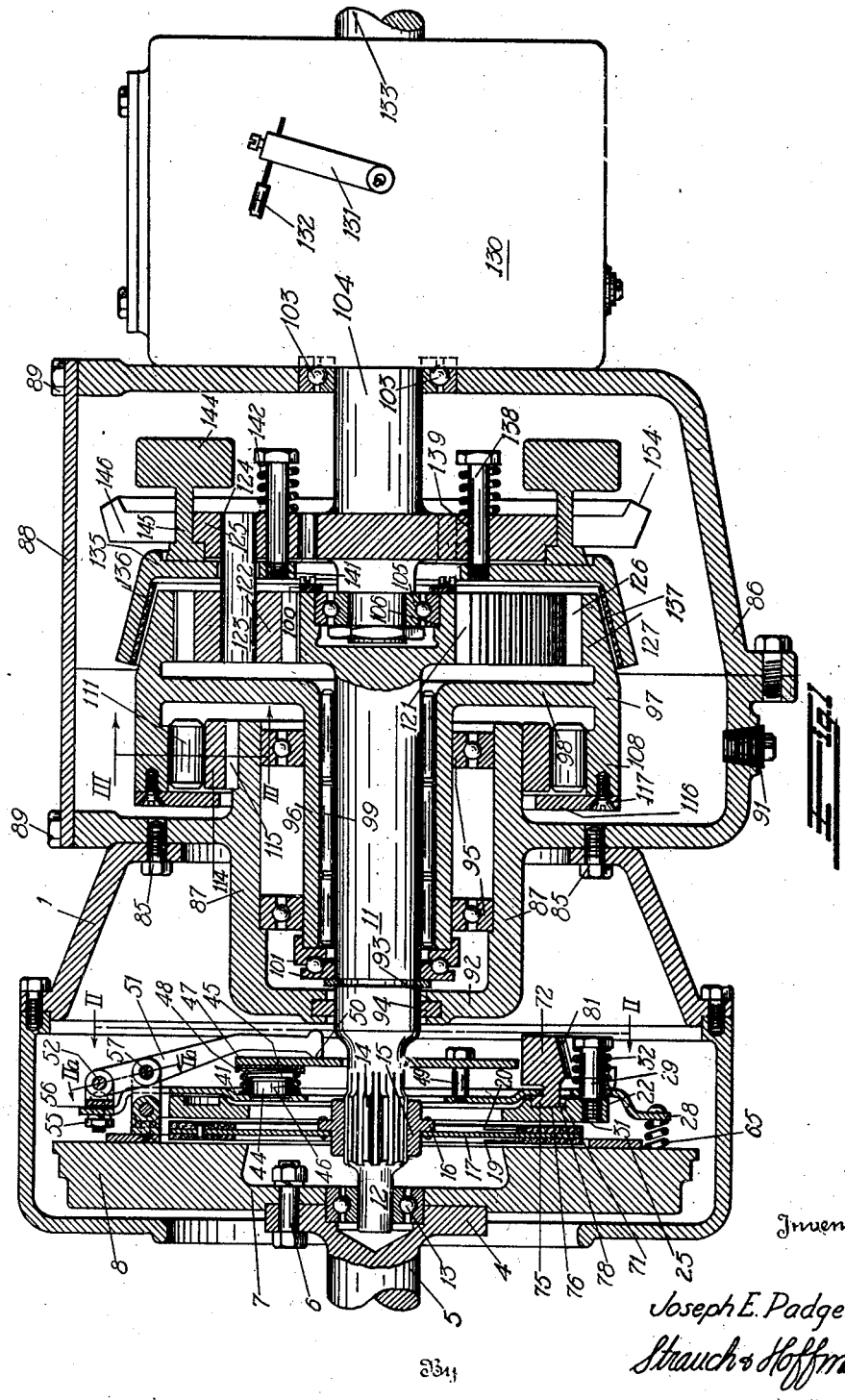
Inventor
Joseph E. Padgett
Strauch & Hoffman
Attorneys

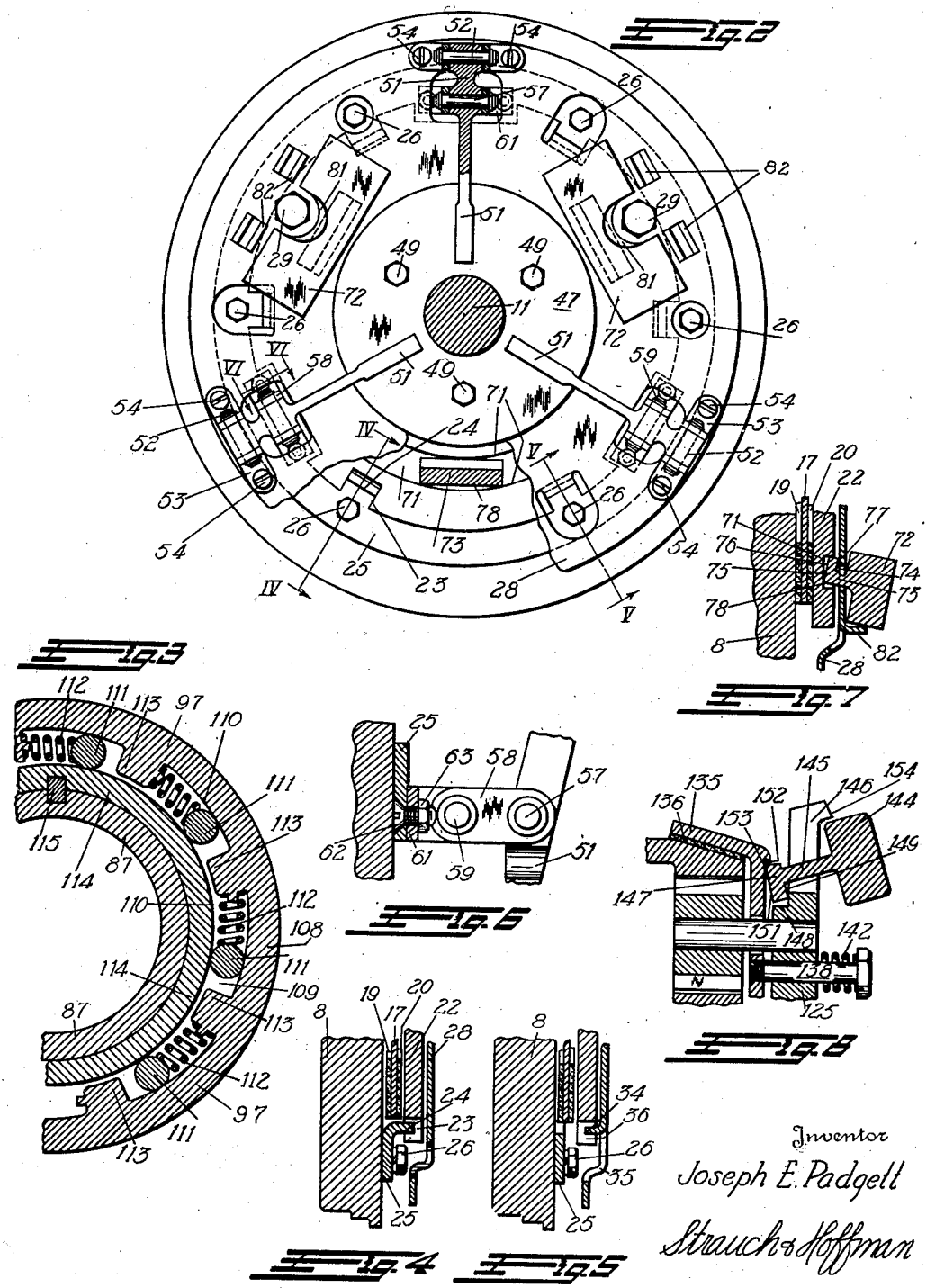

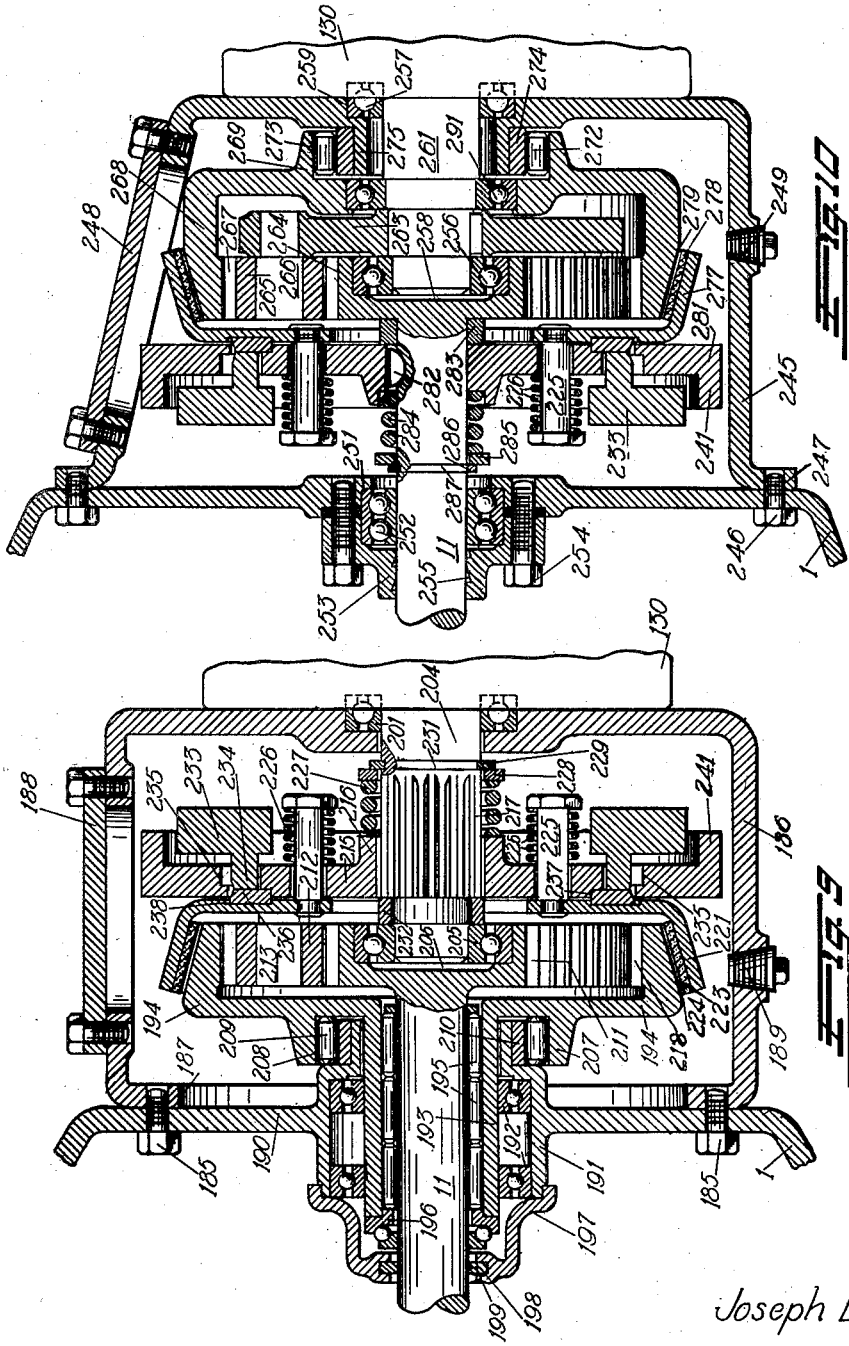

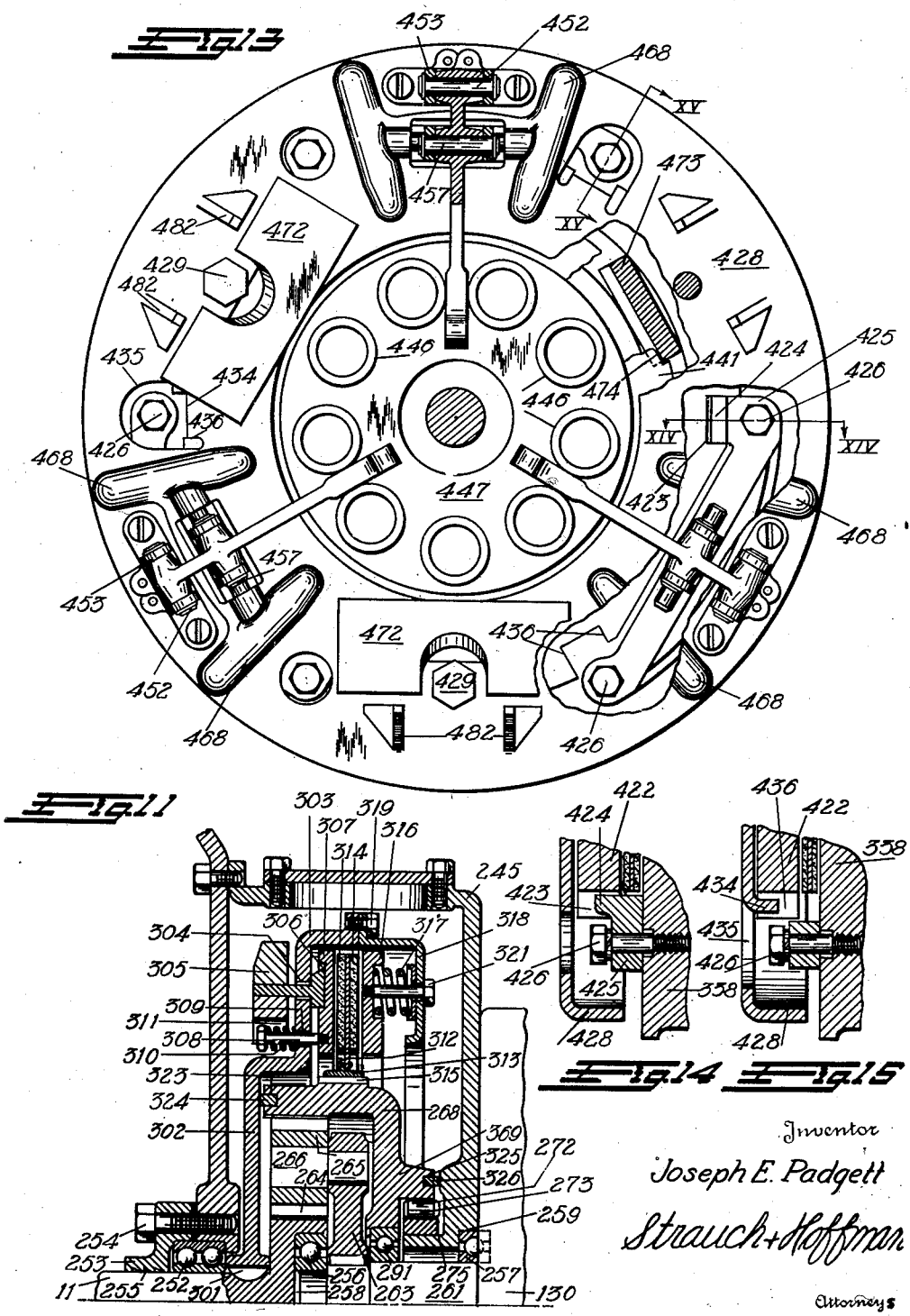

July 9, 1935. J. E. PADGETT 2,007,304
AUTOMATIC POWER TRANSMITTING MECHANISM
Filed Nov. 21, 1932 5 Sheets-Sheet 5
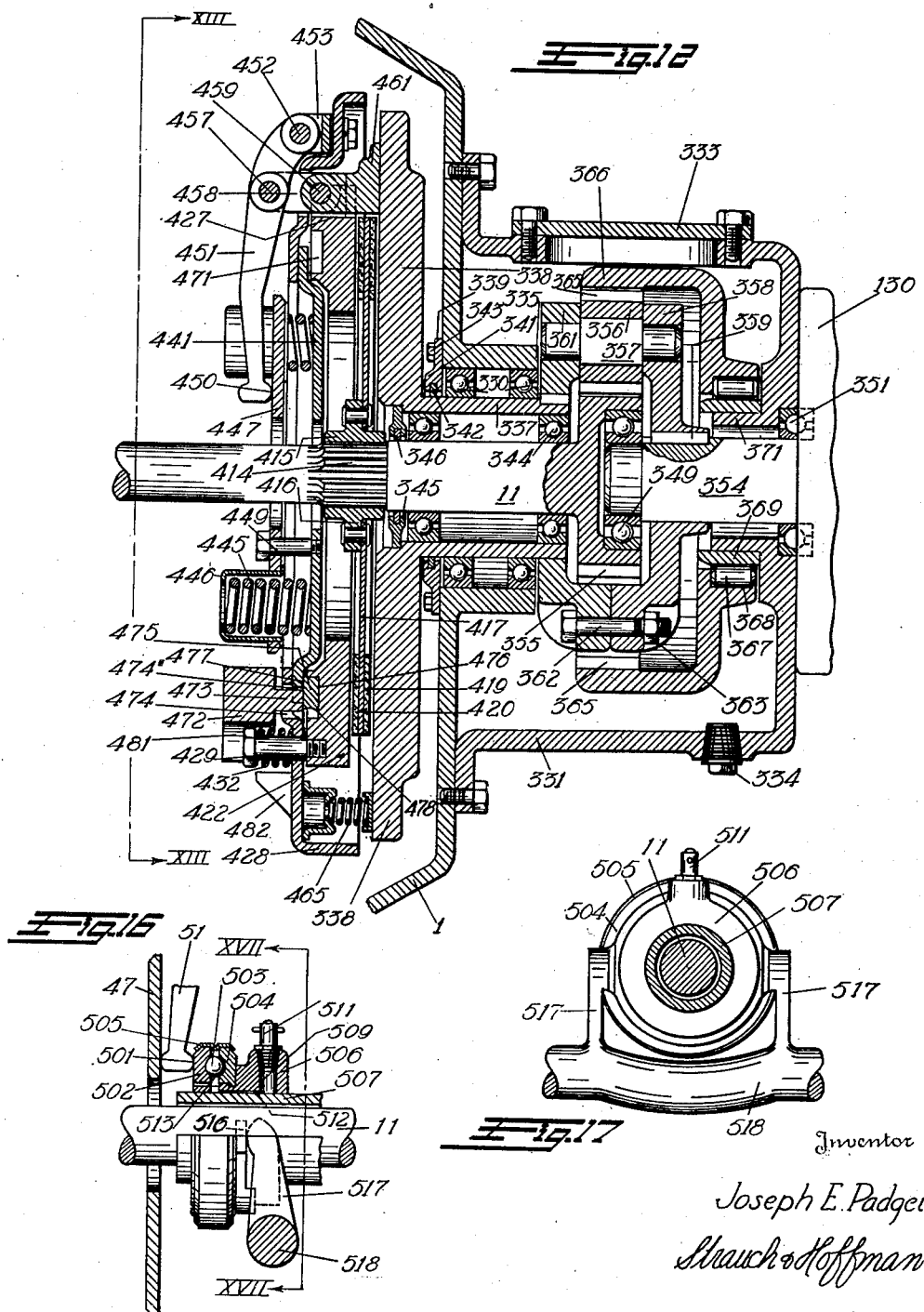

Patented July 9, 1935

2,007,304

UNITED STATES PATENT OFFICE 2,007,304

AUTOMATIC POWER TRANSMITTING MECHANISM

Joseph E. Padgett, Toledo, Ohio

Application November 21, 1932, Serial No. 643,744

46 Claims. (Cl. 74—260)

The present invention relates to automatic mechanisms for transmitting power from a driving member to a driven member, adapted for a wide variety of automotive and industrial drives.

More particularly, the present invention relates to automatic power transmitting mechanisms in which power is delivered from the driving to the driven member with sufficient torque amplification at relatively low driven speeds to pick up the load and to accelerate the driven shaft until it is rotating at a speed where the prime mover can drive the load without the aid of torque multiplication, when the driven member is automatically coupled to the driving member.

Various automatic power transmitting mechanisms have heretofore been proposed, but none of such prior automatic transmissions have been commercially feasible because of the complicated mechanisms utilized, failure to perform all of the functions necessary for practicability, their high cost of production, lack of durability and reasonable life, and excessive size and weight necessary to transmit a reasonable amount of power. While intensive development work has been carried forward and vast expenditures of time and money have been made in efforts to produce automatic transmissions for automotive, industrial and like uses, that will meet the essential requirements of low cost, reasonable life, and satisfactory operation, such efforts have all heretofore failed.

The prior proposed unsuccessful mechanisms have all been designed to pick up the driven loads with as little slippage as possible, with the result that excessive torque multiplication has been necessary to start the loads with prime movers inherently limited to a comparatively small torque delivery at low operating speeds, such as internal combustion engines, high speed electric motors, steam turbines and the like prime movers designed primarily for efficient high speed operation and large power delivery, with comparatively small size and weight. In efforts to provide low cost simple structures, mechanisms with a single ratio of torque multiplication have been proposed but have failed because of lack of flexibility and capacity, and because of inefficient impractical mechanical design. To avoid these difficulties multiple torque ratio mechanisms designed to give flexibility and proper functioning have failed because of complexity of mechanism, lack of life in practice, high cost, and inability to deliver the power necessary when constructed in practically usable sizes and weights.

By providing a combined slipping drive and torque multiplying automatic transmission mechanism in which the prime mover is permitted to operate at a sufficiently high speed to apply substantial torque, and preferably approximately maximum torque to the torque multiplying mechanism at all times when the speed of operation of the driven member is below the point where the prime mover can handle the load in direct drive, in combination with mechanism operative to automatically establish direct drive between the driving and driven members when the driven member is operating at a speed sufficient to enable the prime mover to handle the load without torque multiplication, I have been able to provide simple, highly efficient, low costs and compact power transmitting mechanisms. My improved mechanisms perform the manifold functions and deliver the power required well within the space and size limits allotted to modern automotive transmission mechanisms in entirely automatic manner for forward running, and provide simple low cost reversing drives with a minimum of manual control. Because of the fact that they permit comparatively high speed prime mover operation during starting operations, in addition to being highly useful for automotive drives, they permit the adoption of efficient high speed simplified electrical motors, steam turbines, and the like as prime movers for electrically and steam driven vehicles and industrial drives such as locomotive, elevator, drier, conveyor, crusher and similar drives requiring heavy starting torque, and which have been heretofore driven by expensive prime movers in which low cost and efficiency have been necessarily sacrificed to secure large starting torque at very slow starting speeds.

It is accordingly, a primary object of my present invention to provide low cost, long life compact, light weight, highly efficient automatic transmissions that will permit prime movers utilized therewith to operate at sufficiently high speeds to deliver substantial torque while starting and accelerating the load driven by the transmissions, and operative to automatically establish direct drive through the transmission when the load has been accelerated to a sufficiently high speed to permit effective handling of the load without torque multiplication.

Another object of my invention is to provide automatic power transmitting mechanisms that will automatically disconnect the driving and driven members when the prime mover is operating at speeds below the speed of efficient torque delivery, which will automatically and smoothly transmit power from the prime mover through the driving to the driven member through a torque multiplying mechanism when the driven member is operating at relatively low speed, and which will directly couple the driving and driven members when the speed of the driven member is such that the prime mover does not require torque amplification. Above this speed the driving and driven members are automatically coupled together independently of the torque multiplying mechanism and below this speed power transmission occurs through the torque multiplying mechanism, with smooth continuous delivery of power during the transition between direct drive and torque amplifying drive.

It is another object of the present invention to provide automatic power transmitting mechanisms embodying automatic clutch mechanisms that will automatically and smoothly transmit power from the prime mover through the driving to the driven member through a torque amplifying mechanism when the driven member is operating at relatively low speed, and which will directly couple the driving and driven members when the speed of the driven member is such that the prime mover does not need torque amplification, and wherein the primary automatic clutch mechanism for establishing the torque amplifying coupling between the driving and driven members is so related with the mechanism that it is actuated in accordance with the speed of the prime mover, thereby functioning as a slipping drive to allow the prime mover to operate at speeds necessary to develop adequate power to accelerate the driven shaft through such torque multiplying mechanism, and the secondary automatic clutch mechanism for establishing a direct coupling between the prime mover and driven member is so associated with the mechanism that it is automatically actuated in accordance with the speed of the driven member, so that the direct coupling operation between the prime mover and driven shaft is effected in accordance with the speed of the driven members, securing smooth acceleration of the driven member and avoiding premature engagement of the secondary automatic clutch mechanisms, which would result in prolonged slipping of the secondary clutch mechanisms before a direct drive between the prime mover and driven member could be established.

A further object of the present invention is to provide automatic power transmitting mechanisms that will provide a slipping, torque amplifying coupling between the prime mover and the load driven by the transmission, wherein the slipping period is relatively great to thereby permit prime movers utilized therewith to operate at sufficiently high speeds to deliver substantial torque while starting and accelerating the load, and operative to automatically establish a second slipping torque transmitting coupling between the prime mover and load having a smaller period of slippage than that present in the first slipping coupling to comparatively rapidly couple the prime mover and load for synchronous rotation when the load has been accelerated to a sufficiently high speed to permit effective handling of the load without torque multiplication.

It is a further object of the present invention to provide a power transmitting mechanism that will smoothly transmit power from the prime mover to the driven member through a torque amplifying mechanism when the driven member is operating at relatively low speed, and will automatically directly couple the driving and driven members when the speed of the driven member is such that the prime mover does not require torque amplification and which is provided with mechanism whereby the driving and driven members may be manually disconnected during any phase of transmission operation.

It is a further object of the present invention to provide automatic power transmitting mechanisms that will automatically disconnect the driving and driven members when the prime mover is operating at speeds below the speed of efficient torque delivery, which will automatically and smoothly transmit power from the prime mover to the driven member through a torque amplifying mechanism when the driven member is operating at relatively low speed, and will directly couple the driving and driven members when the speed of the driven member is such that the prime mover does not need torque amplification and which are provided with manually operable mechanism for establishing a direct drive between the driving and driven members when the prime mover is operating at idling speed or is stationary.

Another object of the present invention resides in the provision of automatic power transmitting mechanisms of the character mentioned wherein the torque amplifying mechanism and the associated parts are so designed that they may be manually operated to establish a reverse drive between the driving and driven shafts, without employing auxiliary reverse gear mechanism in connection therewith.

A further object of the invention is to devise a power transmission having a primary driving member, a driven member and power amplifying means including an intermediate shaft, and clutches for coupling said intermediate shaft with said members, one of said clutches so designed and arranged as to be automatically responsive to speeds of the intermediate shaft.

A further object of the present invention is to provide automatic power transmitting mechanisms of the character mentioned so designed that they may be installed in motor vehicles without requiring the projection of the usual clutch pedal and transmission controls into the driver's compartment.

A further object of my invention is to provide automatic power transmitting mechanisms of the character mentioned utilizing a plurality of clutches so designed that the clutches are required to transmit no more than the direct torque of the engine, and are not subjected to amplified torque, thereby providing smooth operation and imparting long life to the mechanisms.

It is another object of the present invention to provide automatic power transmitting mechanisms of the character mentioned provided with slipping drive clutch mechanisms so designed that only a single forward torque multiplication of comparatively low ratio need be employed therein, providing flexible and smooth operation with rapid pick up of the load, and without perceptible transition from torque multiplying operation to direct drive.

My invention further provides a power transmitting mechanism of the character mentioned utilizing a plurality of automatic clutches, so designed that all of the clutch mechanisms incorporated therein may be completely isolated from the chamber housing the torque multiplying mechanisms and bearings so that the clutch mechanisms utilized may be of the dry or self-lubricated type, thus avoiding uncontrollable modification of the operating characteristics thereof through exposure to gear and bearing lubricants.

A further object of the present invention is to provide automatic power transmitting mechanisms of the character mentioned wherein torque multiplying mechanism is provided that is normally inoperative to transmit driving effort to the prime mover with torque amplification when the load is driving the transmission mechanism as for example, during motor vehicle deceleration, thereby avoiding wear of the gear reduction mechanism and permitting the prime mover to operate at low speeds under such conditions.

Another object of my invention is to provide automatic power transmitting mechanisms wherein the torque multiplying mechanism is normally inoperative to transmit driving efforts to the prime mover when the load is driving the mechanism but which may be controlled to cause the torque multiplying mechanism to become operative to transmit power from the driven member to the prime mover whereby, in an automotive vehicle, the braking effect of the engine may be selectively employed to control the speed of the vehicle.

Further objects of my invention will become apparent as the description thereof proceeds in connection with the annexed drawings and are pointed out in the annexed claims.

In the drawings:

Figure 1 is a longitudinal sectional view of one form of an automatic power transmitting mechanism embodying my invention.

Figure 2 is a sectional view taken approximately on the lines II—II and in part on line IIa—IIa of Figure 1, looking in the direction of the arrows.

Figure 3 is a section taken approximately on the line III—III of Figure 1 when viewed in the direction of the arrows.

Figure 4 is a fragmental sectional view taken on the line IV—IV of Figure 2.

Figure 5 is a fragmental sectional view taken upon line V—V of Figure 2.

Figure 6 is a section taken upon line VI—VI of Figure 2, with parts broken away to more clearly show the structure involved.

Figure 7 is a fragmental sectional view of the primary automatic clutch of the mechanism illustrated in Figure 1 of the drawings with the parts thereof in engaged position.

Figure 8 is a fragmental sectional view of the secondary clutch mechanism of the automatic power transmitting mechanism disclosed in Figure 1 with the parts disposed in clutching position.

Figure 9 is a longitudinal sectional view of another form of automatic power transmitting mechanism embodying my invention.

Figure 10 is a view similar to Figure 9 illustrating a further modification of my invention.

Figure 11 is a longitudinal sectional view of another form of automatic power transmitting mechanism embodying my invention.

Figure 12 is a longitudinal sectional view of a further form of automatic power transmitting mechanism embodying my invention.

Figure 13 is a view with parts in section, taken approximately on the line XIII—XIII of Figure 12.

Figure 14 is a fragmental sectional view taken on the line XIV—XIV of Figure 13.

Figure 15 is a view similar to Figure 14 and is taken on line XV—XV of Figure 13.

Figure 16 is a fragmental sectional view illustrating a manual throwout mechanism that may be used in connection with the primary automatic clutch mechanisms of the transmission mechanisms illustrated in Figures 1, 9, 10, 11 and 12 of the drawings, and Figure 17 is a fragmental sectional view taken on line XVII—XVII of Figure 16, looking in the direction of the arrows.

Referring to the drawings wherein like reference characters designate like parts throughout the several views, in Figure 1 a housing 1 is shown, in which a primary automatic clutch mechanism is enclosed which will be described first.

Secured to flange 4 of engine or driving shaft 5, by means of bolts 6 or the like, in well known manner, is web portion 7 of flywheel 8. Disposed in axial alignment with driving shaft 5, and mounted for rotation, is driven shaft 11, which will be hereinafter termed the intermediate shaft and which is reduced at 12 and journaled in a suitable anti-friction pilot bearing assembly 13, mounted in a bore in the end of shaft 5 in well known manner.

Intermediate shaft 11 has the other end thereof operably connected to a novel automatic transmission for amplifying the torque applied to the final driven member in a manner to be presently described. Shaft 11 has a splined portion 14 upon which a correspondingly splined hub 15 is slidably mounted. Hub 15 is provided with a flange 16 to which is secured, by means of rivets or the like, a driven disc 17. While I have disclosed disc 17 as being rigidly secured to flange 16 of hub 15, it is to be understood that if it is desired a resilient coupling of any well known construction may be interposed between these two members for the purpose of dampening out torsional vibrations set up in the crank shaft of the engine.

Each face of disc 17 near the periphery thereof is provided with a facing 19 and 20 respectively, which may consist of any material that has the required characteristics to give the correct frictional gripping force, and at the same time has wearing qualities adapting it for this purpose. I prefer, however, to use the types of material which in practice have given very satisfactory results in an automatic slipping drive and clutch mechanism of the "Powerflo" type. Frictional facings 19 and 20 may be secured to disc 17 in any suitable manner as for instance by rivets or the like.

Facing 19, secured to disc 17, cooperates with the flat face of flywheel 8 and is adapted to be engaged and frictionally driven thereby. Facing 20, provided on disc 17, cooperates with a plate 22 which will be hereinafter termed the automatic plate for the reason that it is automatically actuated and is adapted to engage and clamp driven member 17 between it and the flat face of the flywheel. Disc 17, along with hub 15 and facings 19 and 20, constitutes the driven member, and this entire driven assembly will be hereinafter termed driven member 17 for sake of brevity. Plate 22 is of substantial thickness so that it may possess a sufficient degree of rigidity to prevent distortion and warpage thereof during operating conditions.

Plate 22 is driven with flywheel 8, and is permitted to move axially thereof for clutching and declutching purposes, by means of key slots 23 formed therein, which are disposed at preferably 120° intervals around the periphery of plate 22, each of which cooperates with curved fingers 24 formed on and projecting from the face of member 25, which preferably takes the form of an annular plate secured to the face of the flywheel by means of cap screws 26 or the like. It is to be understood, however, that plate 25 may be so designed as to consist of a plurality of segments or brackets without departing from the spirit of the present invention.

Disposed parallel to automatic plate 22, and also mounted for rotation with flywheel 8, is a plate 28 which will hereinafter be termed the reaction plate because plate 28 takes the reaction of the automatic weights in a manner presently to be described. Referring more particularly to Figures 1 and 2 of the drawings, automatic plate 22 and reaction plate 28 are urged toward each other by means of bolts 29 that are threaded into automatic plate 22 at 31, and are encircled by compression springs 32 which seat at one end directly against reaction plate 28, and at the other end react against the heads of bolts 29. As seen in Figure 2 bolts 29 are three in number and are spaced at approximately 120° intervals about the periphery of plates 22 and 28. While automatic plate 22 is keyed to rotate with flywheel 8, and bolts 29 may act to cause the reaction plate 28 to rotate with automatic plate 22 and therefore flywheel 8, and when bolts 29 are properly designed this keying means is entirely satisfactory. I preferably, however, employ additional means for keying the reaction plate directly to plate 22 and this structure will now be described.

Spaced ears or fingers 34 (Figures 2 and 5) are struck inwardly from enlarged apertures 35 formed in reaction plate 28 at approximately 120° intervals, apertures 35 permitting a wrench or other tool to be introduced therein for manipulating cap screws 26. Ears 34 extend beyond the face of plate 28 into recesses 36 formed in automatic plate 22 and provide driving faces that closely abut the opposite sides of each ear or finger, and are adapted for sliding engagement therewith.

Automatic plate 22 is normally urged toward the flywheel by means of a spring assembly consisting of a plurality of springs interposed between a pair of annular reacting members. To this end reaction plate 28 is provided with an annular seat 41, which receives the reaction of a plurality of springs 45, and is made of sheet metal suitably formed to give it sufficient rigidity for this purpose. Seat 41 is provided at suitable intervals around its periphery with spring retainers 44 which are adapted to center and form seats for one end of compression springs 45. Interposed between springs 45 and plate 28 are heat insulating gaskets 46 which may consist of any suitable material having heat insulating properties, for preventing the transfer of heat from reaction plate 28 to springs 45, so that their proper temper may be maintained even under severe conditions of abuse of the mechanism. However, with the novel mechanism illustrated, it should be particularly noted that no heat is generated in plate 28 because it is spaced from plate 22 in which the heat is actually generated through slipping drive conditions, and therefore heat transfer from plate 22 to plate 28 is relatively slow, due to the cooling effect of ventilating air currents flowing therebetween, and gaskets 46 can accordingly be omitted from all but extremely heavy duty transmissions.

The other ends of springs 45 cooperate with an annular plate 47, which is provided with spring retainers 48 for centering them. Springs 45 may seat directly against plate 47 for the reason that no heat is generated by the elements in contact with plate 47. Plate 47 is apertured at approximately 120° intervals about its periphery and slidably receive cap screws 49, which have the ends thereof reduced to provide a shoulder and are threaded into plate 28. The heads of screws 49 limit the movement of plates 28 and 47 away from each other for a purpose that will presently be set forth. The face of plate 47 bears against and cooperates with curved faces 50 formed on levers 51.

The spring organization just described is low in cost and gives excellent practical results and is preferred, but it is to be understood that if desired springs 45 and plate 47 could be replaced by a properly designed single spring of the type disclosed in the application of Charles B. Spase Serial No. 527,429, filed April 3, 1931, and good results obtained.

Levers 51 are preferably three in number, so that plate 47, in response to the action of springs 45, is urged into a stable position on a three point support, and is thereby caused to exert an equal pressure upon each lever regardless of slight inaccuracies of the levers, holding the levers tight at all times in operation.

The outer end of each lever 51 is journaled on a pin 52, which in turn is secured in a saddle member 53. Each saddle member 53 is secured to the face of reaction plate 28 by means of bolts 54 and nuts 55, cooperating with apertures formed in plate 28. Before saddle members 53 are applied to the face of plate 28, a plurality of adjustment shims 56 are preferably interposed between it and plate 28.

Each lever 51, intermediate its ends, is apertured and provided with a pin 57, upon which the outer ends of link members 58 are journaled. The other ends of each pair of links 58 are provided with a pin 59 rigidly secured therein in any suitable manner and which is journaled in a saddle member 61 secured to the face of annular plate 25 by means of bolts 62 and nuts 63. The heads of bolts 62 are preferably received in countersunk recesses in the face of annular plate 25 so annular plate 25 may seat flush against the flywheel face.

From the structure so far developed it will be seen that automatic plate 22 and reaction plate 28 are keyed together and are also keyed to rotate with the flywheel 8, and yet are permitted to move axially thereof and with respect to each other for clutching and declutching purposes. It will moreover be seen that plates 22 and 28 are urged together by springs 32 and the inner ends of levers 51 are urged to the right as shown in Figure 1, by springs 45 which motion tends to urge plates 22 and 28 as a unit toward the flywheel face through the medium of links 58. The plates are held however in the positions they are shown in Figure 1 in what I term the automatic position, and this positioning of the parts is effected by cap screws 49 which limit the movement of plates 28 and 47 away from each other under the influence of springs 45 and therefore establish a clearance between automatic plate 22 and the driven member in operation. Levers 51, are always held under stress by the action of a plurality of relatively light compression spring 65 interposed between reaction plate 28 and flywheel 8 to hold the inner ends of levers 51 firmly against plate 47 at all times and thus ensure the maintenance of a slight plate clearance at idling speed.

In operation, plate 28 is urged toward the flywheel by the direct pressure of springs 45 by virtue of their direct reaction, and plate 28 is further urged toward the flywheel by the outer ends of springs 45 which, through plate 47 and levers 51 exert an amplified force upon plate 28. As above pointed out, however, springs 45 are restrained from urging plate 22 into contact with the driven member by studs 49, which are so designed that a small clearance exists between the plates when the centrifugal mechanism is inoperative.

In view of the fact that reaction plate 28 and the outer ends of levers 51 may be adjusted toward and away from each other by shims 56, shims 56 may be inserted or withdrawn from the proper saddle member assemblies 53 to bring about proper parallel relation of parts. It is contemplated that the shim adjustment shall be an initial factory adjustment for the reason that after the clutch mechanism has been in use, there is no tendency for automatic plate 22 and reaction plate 28 to work themselves into non-parallel relation with the flywheel because the wear that does occur on the faces of each lever 51 will occur to an equal extent upon each of them since they are acted upon by an equal force, namely, one-third of the total pressure exerted by springs 45, due to the three point nature of the connection existing between the springs and the levers.

The preferred automatic speed responsive or centrifugal operating mechanism will now be described. The rear face of automatic plate 22 is provided with an annular recess 71 which is preferably rectangular in cross-section, and which provides a flat bottom face against which the automatic or centrifugal weights fulcrum and react to cause clutch engagement. Centrifugal weights, designated generically by reference character 72, are preferably three in number and are disposed between the lever and saddle assemblies. Each centrifugal weight preferably consists of a lever section 73 which is of substantial width and which sections are received in rectangular apertures 74 formed in reaction plate 28. Levers 73 carry at their extremities heads 75, each of which is provided with a flat face 76 that normally abuts the bottom face of annular recess or grooves 71 in automatic plate 22 when the engine or prime mover is operating at idling speed or is stationary. Heads 75 are also provided with a reaction face 77 which normally abuts the face of reaction plate 28 and is designed for fulcruming engagement therewith during operation of the weights. Heads 75 have their outer sides relieved to provide knife-like edges 78 which are adapted to rotate or pivot on the bottom face of recess 71 formed in automatic plate 22. The relieving operation enables a good knife edge 78 to be formed on each weight head 75, and allows pivotal movement thereof without interference from the outer side wall of groove 71. However, unrelieved weights may be employed in a groove that is suitably designed, so as to have a relieved outer side wall. It is to be also understood, that if desired, individual rectangular seats may be formed in plate 22 for cooperation with heads 75 of weights 72, though I prefer to employ an annular groove in plate 22 because of the advantages of such structure that will now be set forth.

Referring more particularly to Figure 2 of the drawings, each extremity of knife edge 78 is seen to engage the outer wall of recess 71, while the inner face of head 75 engages the inner wall of recess 71, thereby preventing rotation of heads 75 and keeping them in proper assembled relationship at all times. In this connection it should be noted that when plates 22 and 28 are separated, heads 75 of weights 72 may be lifted out of recess 71, and the weights removed from the mechanism. This is a desirable feature because the weights can then be made integral and readily incorporated in the mechanism after they have been completely machined, thus cutting down production costs. Knife edges 78 are adapted to cooperate with the flat bottom face of recess 71 and thereby act in line contact upon plate 22 for a substantial distance across the face thereof, whereby uniform distribution of pressure around the entire area of the automatic plate is effected. It should be particularly noted that no expensive machining operations are required to provide accuracy of the centrifugal weights because annular groove 71 is readily machined in plate 22 in a single inexpensive operation and the weight heads are securely held in position therein during all stages of operation.

The mass of weights 74, and the number employed in a particular installation is determined by a consideration of the combined pressure that they must transmit for proper operation of the clutch mechanism. In the automatic drive and clutch mechanism shown, three equally spaced weight assemblies are employed. Each weight 72 is further provided with a recess 81 which allows free operation thereof without interfering with holdback bolts 29.

It will therefore be seen, as the speed of the flywheel increases, each weight 72 will gradually swing outwardly about the edge 78 as a pivot in response to centrifugal force. As this occurs, reaction faces 77 of heads 75 will abut and slide on the face of reaction plate 28, and knife edge 78, by virtue of its engagement and pivoting upon the flat bottom surface of annular groove 71 in automatic plate 22, will force automatic plate 22 into engagement with facing 20 of disc 17, thus causing disc 17 to move axially and bring the face 19 thereof into contact with the flywheel face. As this occurs, face 77 of head 75 will force reaction plate 28 away from the flywheel against the action of springs 45, which act directly upon plate 28 at one end, and act indirectly at the other end through the medium of levers 51 to resist movement of reaction plate 28 away from the flywheel. Accordingly, as weights 72 swing outwardly and bring the driving and driven members into clutching engagement, reaction plate 28 is forced away from the flywheel, and due to the resilient nature of the backing means therefor, should certain weights 72 swing further outwardly than the remaining weights, the pressure exerted thereby will nevertheless be uniformly distributed about the periphery of plate 22 for the reason that reaction plate 28 can take a slight angular position with respect to automatic plate 22, due to the fact that its sole movement limiting means is constituted by springs 45.

If reaction plate 28 were not allowed to rock in the manner just described, the reaction thereof against outward movement of the weights 72 would be equal, and if the outward movement of certain weights were greater than that of the remaining weights, the resulting action of these weights would cause a greater force to be exerted upon automatic plate 22 in the regions against which they act, and therefore automatic plate 22 might be distorted as a result of such non-uniform application of force thereto and clutch engagement would not be as smooth as with the mechanism illustrated.

Referring to Figure 7 of the drawings, the centrifugal weight there disclosed is shown in its outermost position, and automatic plate 22 and reaction plate 28 are shown in their separated positions, at which time driven member 17, carrying faces 19 and 20, is clamped securely between automatic plate 22 and flywheel 8 and the clutch is thus engaged. To definitely limit the swinging movement of each weight assembly in its outward direction a finger 82 is struck out of plate 28 on each side of holdback bolts 29, which weights 72 are adapted to engage, thereby providing a definite stop for each centrifugal weight assembly so that at extremely high speeds excessive pressure between automatic plate 22 and the driven member cannot occur, and to definitely stop all of the weights in a common plane normal to the axis of the mechanism, so that at high speeds dynamic balance of the entire mechanism is secured, and vibration thereof is avoided.

The parts of the clutch mechanism illustrated in Figure 1 are shown in the positions they assume when the engine or prime mover is idling or stationary. As the prime mover accelerates, centrifugal weights 72 gradually swing outwardly and cause automatic plate 22 to move toward and force clutch member 17 against the flywheel in the manner previously described. It should be noted that the movement of automatic plate 22 away from reaction plate 28 is opposed by holdback springs 32, and therefore weights 72 are held under control and do not vibrate. Holdback springs 32 therefore, in addition to predetermining the speed of the mechanism at which clutch operation is initiated, exert a steadying influence upon the mechanism. As weights 72 swing further outwardly they react against plate 28 and cause pressure to be gradually built up in springs 45 and this gradual build up of pressure in spring 45 causes a torque of gradually increasing magnitude to be transmitted to driven shaft 11. Rotation of intermediate shaft 11 is thus initiated without shock. When the prime mover attains sufficient speed, weights 72 will have swung to their furthermost limits in contact with fingers 82 and the driving and clutch parts will be in firm driving engagement with no slippage between them. A smooth automatic drive with a slipping pick up that permits the prime mover to operate at efficient torque delivery speeds at all times is thus established from the prime mover to the intermediate shaft 11.

Holdback springs 32 and pressure springs 45 are preferably so designed that when they are compressed by the action of weight 72, a slipping torque transmitting connection will be established between the driving and driven members, for a period as great as or greater than approximately 100% to 125% of the initial engaging speed of the driving member. For instance, if in the particular automatic clutch illustrated, the clutch commences to engage and transmit torque when the speed of the driving member is, for example, 500 revolutions per minute, engagement may be completed with sufficient pressure so that no slippage will exist between the driving and driven members when the driving members attains a speed of approximately 1,000 or more revolutions per minute. The automatic clutch, in establishing a slipping drive between the prime mover and load, over a substantial speed range, permits the prime mover to operate at a higher point on its speed-torque curve and therefore to develop more torque than if the conditions of substantially no slippage between the prime mover and load existed.

In the particular clutch illustrated, holdback springs 32 may be so designed that they urge automatic plate 22 and reaction plate 28 together with a total force of approximately 400 pounds, and pressure springs 45 are designed that they oppose the reaction of reaction plate 28 with a total force of approximately 1,200 pounds when the plates are fully engaged and weights 72 are in their outermost positions against their stops 82. Therefore, weight 72 must exert a certain force to initiate clutch engagement, and approximately four times this force to complete the engagement, when they are exerting their full pressure. Accordingly, in view of the fact that in centrifugal mechanism of this character the available forces vary as the square of the speed, the speed of the driving member at the completion of clutch engagement, will be double the speed at which clutch engagement is initiated, and a wide range of slipping drive is provided permitting the prime mover to operate at sufficient speed to develop substantial torque at the point of complete non-slipping clutch engagement.

Secured to housing 1 by means of cap screws 85 or the like is a sectional transmission housing 86 provided with a cylindrical bearing support 87 which extends into clutch housing 1 through the opening therein and extends also into housing 86. Transmission housing 86 is provided with a cover 88 detachably secured thereto by means of cap screws 89 or the like, and with a drain plug 91 for draining lubricant therefrom.

Member 87 is provided with a wall 92 which extends toward shaft 11 and terminates short thereof. Annular groove 93 formed in wall 92 is provided with a sealing member 94 adapted to engage shaft 11 to prevent lubricant contained in housing 86 from leaking into clutch housing 1.

Journaled in combined radial and thrust anti-friction bearings 95 supported within member 87 is cylindrical sleeve 96 connected to clutch member 97 by an integral web 98. Intermediate shaft 11 extends through sleeve 96 and is journaled therein by means of suitable roller bearings 99. A thrust bearing assembly 101 having its races rigidly secured to shaft 11 and sleeve 96 respectively is provided.

Disposed in axial alignment with shaft 11, and having the rear end thereof mounted for rotation in an anti-friction bearing 103 supported in an aperture in housing 86 is a shaft 104. The front end of shaft 104 is mounted for rotation in a combined radial and thrust anti-friction bearing 105, located in bore 106 formed in the enlarged rear end of shaft 11 and held in said bore by a ring 100 which may be secured by screws or any other suitable manner to the enlarged portion of the shaft. Bearing 105 is so designed that it rotatably supports shaft 104 for radial loads, and at the same time will efficiently take axial thrusts tending to move shafts 11 and 104 relative to each other.

From the structure so far developed it will be seen that shaft 11 and clutch member 97 are mounted for rotation relative to each other within cylindrical portion 87 of housing 86, and shaft 104 is mounted for rotation in housing 86 and may rotate relative to shaft 11 and clutch member 97. Clutch member 97 is provided with an annular rim 108, the internal face of which is provided with a plurality of recesses 109 (Figure 3). The outer walls of recesses 109 are provided with cam faces 110, with which rollers 111 are adapted to engage to prevent anti-clockwise rotation of clutch member 97 when the mechanism is viewed from the left hand side of Figure 1. Abutting against each roller 111 is one end of a compression spring 112, the other end of which abuts against projections 113 formed in recesses 109. Rollers 111 also cooperate with an annular race member 114 which is frictionally fitted upon the outer face of member 87, and keyed thereto in any suitable manner as by a feather key 115 or the like. Clutch rollers 111 are retained in operative position against endwise displacement within the mechanism by means of a plate 116 (Figure 1) secured to the radial face of rim 108 by means of screws 117 or the like. Referring to Figure 3, anti-clockwise rotation of member 97 is prevented by rollers 111 wedging between cam faces 110 formed in member 97 and the outer periphery of stationary race member 114. Clockwise rotation of member 97 is permitted because rotation in this direction of member 97 causes rollers 111 to roll down their cams 110 and thus frees them from their wedging disposition between the cams and race 114.

As cam faces 110, with which rollers 111 cooperate, are formed in rotating member 97, when member 97 is rotating in a clockwise direction in Figure 3, clutch rollers 111 are overrunning and centrifugal force acting on them tends to cause them to roll down their respective cam faces against the action of springs 112. This movement of rollers 111 helps them to be withdrawn from engagement with member 114, and as there tends to be no engagement thereof with relatively moving parts, rollers 111 will not have flat portions worn on their cylindrical faces and will have a long life. Springs 112 may be relatively light because the only time they are called upon to function is when member 97 is brought to rest at which time there is no centrifugal force acting upon rollers 111, which are then readily wedged between cams 110 and member 114 by the action of springs 112, thereby locking member 97 against anti-clockwise rotation.

Shaft 11 is provided with an enlarged end portion upon which gear teeth 121 are formed. Meshing with gear teeth 121 are pinions 122 which are rotatably journaled on studs 123 which in turn are rigidly secured in apertures 124 formed in reaction member 125, preferably integral with shaft 104. Gear and shaft assemblies 122 and 123 respectively are preferably three in number, although the mechanism will function satisfactorily if a greater or less number are employed. Pinions 122 cooperate with the internal gear teeth 126 formed on the inner periphery of annular extension 127 formed on member 97.

When driving shaft 5 is operated below a predetermined speed, for example engine idling speed, there is no connection between shafts 5 and 11 due to retraction of centrifugal weights 72 by the action of holdback springs 32. When the prime mover is accelerated to a speed substantially above idling speed, centrifugal weights 72 swing outwardly and cause automatic plate 22 to engage and clamp driven member 17 between it and the flywheel face, simultaneously causing pressure to be built up in springs 45 and transmitting torque to shaft 11 in the manner previously described. Clockwise rotation of shaft 11, viewed from the left end of Figure 1, through the medium of gear teeth 121, tends to cause pinions 122 to rotate in an anti-clockwise direction. With shaft 104, which carries pinions 122 upon member 125, resisting rotation, and shaft 5 driven, pinions 122 tend to rotate about shafts 123 as stationary axes and to cause anti-clockwise rotation of member 97 viewed from the left end of Figure 1, which however, is prevented by clutch rollers 111, which, as above pointed out wedge themselves between cam faces 110 and the periphery of stationary race member 114. Member 97 is therefore restrained from anti-clockwise rotation, and shafts 123, upon which pinions 122 are mounted, are caused to travel with a planetary movement in a clockwise direction causing clockwise rotation of shaft 104. Accordingly, shaft 11, through the medium of pinions 122 and clutch member 97, will during such operation, transmit amplified torque to shaft 104, causing it to rotate in the same direction as shaft 5, the torque amplification depending upon the gear ratios utilized.

Shaft 104 may constitute the final driven member for various types of industrial or like drives or may extend into a housing 130, which may enclose any well known reversing mechanism provided with a control lever 131 having an operating wire 132 associated therewith. Control wire assembly 132 in the present instance constitutes the well known Bowden wire control and may be operated by a control knob on a vehicle dash or in any other suitable location for shifting lever 131 to shift the gears contained in housing 130 to reverse the final drive. It is to be understood of course that if desired, any other linkage mechanism might be employed to operate lever 131 and a perfectly satisfactory organization obtained. Extending outwardly from housing 130 is driven shaft 133 which is connected to the propeller shaft of the motor vehicle in any well known manner.

After the vehicle (or other load) has been brought up to a predetermined speed by means of gears 121 and 122, a direct drive between shafts 11 and 104 is established by means of a centrifugally actuated clutch member 135, provided with a facing 136 which may consist of any suitable material, but which preferably is made of the material used for clutch facings 19 and 20 containing solid lubricant. However, as facings 136 operate in housing 86, which is designed to contain lubricant, it is apparent that a facing material having an inherently higher coefficient of friction can be used because the coefficient of friction of facing material 136 in practice will be materially lowered by the presence of the lubricant in which it is normally partially immersed.

Facing 136 cooperates with driving face 137 formed on member 97. Clutch member 135 is held in place in the mechanism by means of a plurality of shouldered bolts 138 slidably received in apertures 139 formed in reaction member 125 and threaded into clutch member 135 at 141. Bolts 138 compel clutch member 135 to rotate with disc member 125. Members 125 and 135 are urged together by means of compression springs 142, which encircle bolts 138 and bear against the heads thereof.

Clutch member 135 is caused to move into clutching engagement with face 137 by means of a plurality of centrifugal weights 144 which are similar in structure and function, to weights 72, previously described. Each weight 144 is provided with a rectangular lever portion 145 of substantial width which seats in a recess 146 formed in the periphery of member 125. Each weight 144 is further provided with a head 147, the inner portion of which seats in an annular groove 148 that is preferably machined in member 125. Each head 147 is provided with a base 149 adapted to react and fulcrum against the shoulder provided by groove 148. Provided on each head 147 is a flat face 151 adapted to seat against the flat face of counterbore 152 formed in member 135 when the weights are in their neutral or retracted position. Heads 147 are further provided with knife edge fulcrums 153 adapted to fulcrum on the flat face of counterbore 152 in operation. Annular recess 148 and counterbore 152 are readily machined in members 125 and 135 respectively, and efficiently retain weights 144 during all conditons of operation. Each extremity of knife edge 153 contacts the outer peripheral wall of counterbore 152, while the inner portion of head 147 contacts the cylindrical wall of recess 148, thereby preventing rotation of weights 144 while the side walls of recesses 146 prevent circumferential displacement of weights 144. The mass and number of weights 144 employed is largely a matter of choice depending upon a consideration of the forces that they must exert upon plate 135, and in the present instance six equally spaced centrifugal weight organizations are employed.

In order to limit the outward movement of weights 144 under the influence of centrifugal force, reaction member 125, adjacent the periphery thereof is provided with a flange 154, with which weights 144 are adapted to cooperate as shown in Figure 8. The parts as they appear in Figure 8 correspond to fully engaged conditions, with a slight clearance existing between weight 144 and stop 154. During normal driving operations such clearance will be maintained, stops 152 being employed to limit further outward movement of weights 144 when engine speeds are excessive, thereby preventing facing 136 from being subjected to excessive squeezing action under such conditions, and to also prevent excessive elastic deformation of clutch parts that are subjected to the action of the weights.

Assuming that shafts 11 and 104 are being driven through the medium of gearing 121 and 122 as previously described, with shaft 104 rotating at a speed at which the prime mover can develop sufficient torque to handle the load without torque multiplication, centrifugal weights 144 will pivot outwardly about their knife edges 153 forcing clutch member 135 away from reaction member 125 against the action of spring 142, thus causing facing 136 to engage face 137. It will be remembered that during the operation of gears 121 and 122, prior to engagement of facing 136 with face 137 formed on drum 97, drum 97 is held at rest against its tendency to rotate in an anti-clockwise direction by overrunning clutch rollers 111. Gradual engagement of members 136 and 137 caused by the operation of weights 144, now causes member 97 to be gradually accelerated in a clockwise direction, disengaging clutch rollers 111. Pinions 122 previously disposed between rotating gear 121 and a stationary internal gear 126, are then disposed between two gears rotating in the same direction, shaft 104 is accelerated in accordance with the acceleration of member 97, and when members 135 and 97 are locked together with no slippage between them by the increased pressures exerted by weights 144, shafts 104 and 11 are driven at the same speed since gears 122 are restrained from rotating by virtue of their engagement with member 97, which is then locked against rotation with relation to member 125 by which they are carried.

During the engagement of surfaces 136 and 137, sleeve 96 and shaft 104 tend to separate due to the action of centrifugal weights 144, but this end thrust is opposed by thrust bearing 101 associated with shaft 11 and sleeve 96 and by thrust bearing 105 associated with shafts 11 and 104. When clutch members 135 and 137 are fully engaged sleeve member 96 and shaft 11, between which thrust bearing 101 is interposed, are stationary with respect to each other and shafts 11 and 104 have no relative angular movement. Therefore thrust bearings 101 and 105, when the transmission is operating in direct drive, do not rotate and perform the sole function of absorbing the thrust of centrifugal weights 144 and accordingly have a long life under heavy thrust loads.

When operating a vehicle provided with an automatic transmission mechanism of the character described in direct drive, all that is necessary to bring it to a stop is to release the accelerator and to apply the brakes. When the vehicle has de-celerated to a predetermined speed through the combined braking action of the engine and the brake mechanism, centrifugal weights 144 will be restored to their neutral position under the influence of holdback springs 142, releasing clutch members 135 and 137. Shaft 104 will then drive shafts 123 and pinions 122 with a planetary movement around gear 121 rotating with the engine, which tends to drop to idling speed because the throttle is closed. Pinions 122 will accordingly rotate in a clockwise direction as viewed from the left end of Figure 1, about their respective axes, and will cause member 97 to rotate in a similar direction. As overrunning clutch 111 will lock member 97 only against anti-clockwise rotation, clutch rollers 111 will be shifted into their disengaged positions and member 97 will rotate in its bearings 95, thus relieving gears 122 of all tooth pressure, the driving connection will be broken and the engine will accordingly drop to idling speed releasing the primary clutch connection between shafts 5 and 11 until the engine is again accelerated. Although the braking effect of the engine is not utilized after disengagement of clutch surfaces 136 and 137, the vehicle speed at which centrifugal weights 144 retract is so low that the greater part of the braking effect of the engine has already been utilized in decelerating the vehicle. As soon as disengagement of the clutch interconnecting shafts 5 and 11 occurs, shaft 11 and driven member 17 are free to idly rotate and may do so under the influence of shaft 104 acting through gears 122. Member 97 likewise may rotate since it is urged in a clockwise direction by pinions 122 so long as shaft 104 rotates. However, under these conditions little or no rotation of gears 122 about their shafts 123 occurs, depending upon the friction present in the bearings for shaft 11 and member 97 respectively.

After both clutch mechanisms are released, the vehicle may be brought to a complete stop by continued application of the brake mechanism, or if desired, the engine may be accelerated, causing weights 72 to swing outwardly about their pivots thereby coupling shafts 5 and 11. Gear 121 will then drive pinions 122 and the reaction of pinions 122 against shafts 123 tends to produce anti-clockwise rotation of member 97, thus causing clutch rollers 111 to lock member 97 in a stationary condition, thereby causing shafts 123 to travel in a circular path again transmitting amplified torque to shafts 104 and 133. When shaft 104, and consequently the vehicle, attains sufficient speed, centrifugal weights 144 again swing outwardly about their fulcrums and actuate clutch member 135 to establish a direct drive between shafts 11 and 104 in the manner previously described.

When it is desired to reverse the vehicle the engine is decelerated to idling speed and the Bowden wire control knob is operated to actuate lever 131 to shift the reversing mechanism contained in housing 130. The engine is then accelerated, causing shaft 104 to be driven by engine shaft 5 in the manner previously described, and although it is possible, if the engine is accelerated sufficiently, to establish a direct drive between shafts 11 and 104 when operating in reverse gear, it is contemplated that the desired vehicle speed in reverse is so low that shaft 104 will be driven by shaft 11 through the medium of gears 121 and 122 to transmit only an amplified torque thereto.

It is therefore seen, that with the present drive mechanism the necessity for a clutch pedal and gear shift lever is entirely dispensed with, and the number of controls in the driver's compartment of the vehicle is materially reduced, a brake pedal and accelerator constituting the entire control mechanism for the entire vehicle driving mechanism.

Due to the smooth operating characteristics of the primary automatic clutch mechanism, and its ability to smoothly transmit torque efficiently under slipping drive conditions, if called upon, it could in fact be employed to directly couple shafts 5 and 104, and would stand up under these conditions in view of the lubricated character of the facing material employed therein and the heat dissipating capabilities thereof. Therefore the ratio of the gearing interposed between shafts 11 and 104 may have a fairly low multiplication and yet permit the vehicle to be started on steep grades with perfect ease. This is a particularly desirable characteristic for the reason that when the vehicle is being accelerated through the intermediary of gears 121 and 122, the relative speed of shafts 11 and 104 is not excessive and when shaft 104 reaches sufficient speed and weights 144 operate, they are not called upon to bring two shafts into synchronism that are rotating at widely variant speeds, and therefore can smoothly and efficiently perform the functions required of them.

While the mechanism shown provides only a single gear reduction, which is entirely satisfactory in a light vehicle of the pleasure car class, it is to be understood that in heavy duty vehicles, such as trucks, busses, rail cars and the like, two or more of the transmission units disclosed would be disposed in series behind a single primary clutch to give two or more gear reductions, and in such case the centrifugal weights of the first secondary clutch mechanism would be so designed as to move into full engagement considerably before the centrifugal weights of the second secondary automatic clutch mechanism came into play, so that a direct drive would be established between the shaft coupled by the first secondary automatic clutch mechanism while torque is transmitted between the shaft coupled by the secondary clutch mechanism through the gear reduction. In such a power transmitting mechanism final conditions are reached when the primary automatic clutch mechanism and all of the secondary automatic clutch mechanisms are fully engaged and a direct drive is established from the engine to the rear wheels of the vehicle.

In practice the secondary or direct coupling clutch operated by weights 144 is preferably designed so that the complete engagement is comparatively rapid, so that full engagement occurs with a speed difference of approximately ten to twelve percent or less, or approximately one tenth of the speed difference in which slipping drive conditions exist in the primary clutch so that the opportunity for prolonged slipping during load conditions under which the direct coupling clutch is in slipping drive engagement as might occur under unusual conditions in practice, is reduced to a minimum. The primary or slipping drive clutch, it will be noted, is separately housed from the direct coupling clutch and gearing, so that suitable lubricant for the gearing may be supplied in the gear housing without affecting the slipping drive primary clutch.

Referring to Figure 9 of the drawings, I have disclosed a modified form of power transmitting mechanism which is similar in some respects to that disclosed in Figure 1, and is adapted to be used in connection with a primary automatic clutch mechanism having similar characteristics to that shown in Figure 1 and therefore the reference characters 1 and 11 have been applied to the clutch housing and intermediate shaft there shown.

Secured to the rear face of clutch housing 1 by means of cap screws 185 or the like is transmission housing 186 provided with a rather large opening 187 permitting some of the mechanisms to be withdrawn therethrough when housings 1 and 186 are disassembled. Housing 186 is also provided with the usual inspection cover 188, and lubricant drain plug 189.

Radial wall 190 of clutch housing 1 is provided with a cylindrical bearing support 191 in which is mounted a set of bearing assemblies 192 for journaling the sleeve 193 of a clutch member 194. Shaft 11 is journaled in member 193 by means of roller bearings 195 for radial loads, and a thrust bearing assembly 196 has the races thereof rigidly connected to sleeve 193 and shaft 11 respectively for resisting axial movement of sleeve 193 to the left with respect to shaft 11 for a purpose that will presently appear. Secured to the hub of member 191 by screw threads or the like is a sealing member 197 having an annular groove 198 formed therein which contains a suitable packing member 199 which cooperates with shaft 11 and consists of leather or any other suitable material for preventing lubricant from working along shaft 11 into the clutch housing.

Disposed in axial alignment with shaft 11 and having the rear end thereof mounted for rotation in bearing 201 supported in an aperture in housing 186, is a shaft 204. The other end of shaft 204 is mounted for rotation in a pilot bearing 205 located in a recess 206 formed in the enlarged rear end of shaft 11. Bearing 205 is designed to support shaft 204 for radial loads and at the same time to efficiently take axial thrust tending to move shafts 11 and 204 relative to each other, and to this end the respective ball races are rigidly secured in any suitable manner to their respective supporting members.

Clutch member 194, is provided with an annular rim 207 in which clutch roller cam pockets 208 are formed. Clutch rollers 209 cooperate with the pockets 208 and with a stationary race 210 secured to member 191 to form an overrunning clutch assembly substantially like that disclosed in connection with the power transmitting mechanism of Figure 1 of the drawings, and hence a further description of the present overrunning clutch is unnecessary. Shaft 11 and clutch member 194 are thus mounted for rotation with each other and with respect to the clutch housing 1, and clutch member 194 is locked against anti-clockwise rotation when the device is viewed from the left hand side of Figure 9.

Shaft 11 is provided with an enlarged end upon which gear teeth 211 are formed. Meshing with gear teeth 211 are pinions 212, rotatably journaled upon studs 213 which in turn are rigidly carried by a reaction member 215. The latter has a splined hub 216 slidably mounted upon splined portion 217 of shaft 204. In the device shown in Figure 9, pinion and shaft assemblies 212 and 213 respectively, are preferably three in number. Pinions 212 cooperate with internal gear teeth 218 formed on the inner annular face of member 194.

In the structure so far described, as the weights 72 of the primary automatic clutch mechanism swing outwardly and cause rotation of shaft 11, such rotation, through the medium of gear teeth 211, causes pinions 212 to tend to rotate in an anti-clockwise direction. Shaft 204, which carries pinions 212 upon reaction plate 215 thereof, resists rotation and thus pinions 212 rotate about the axes of shafts 213 and tend to cause anti-clockwise rotation of member 194. Anti-clockwise rotation of member 194, however, is prevented by clutch rollers 209 which, in response to anti-clockwise rotative tendency of member 194 cooperate with the race member 210 and cams 208 to lock member 194 against rotation. Since member 194 is therefore positively restrained from anti-clockwise rotation the shafts 213, upon which pinions 212 are mounted, are caused to travel in a clockwise planetary path, causing clockwise rotation of shaft 204. It is thus seen that shaft 11, through the medium of pinions 212 and clutch member 194, transmits an amplified torque to shaft 204 and causes it to rotate in the same direction.

Shaft 204 may constitute the final driven member or load, but is preferably associated with the reversing gear housing 130, which is similar in structure to that shown in connection with the automatic power transmitting mechanism of Figure 1, and functions in precisely the same manner for obtaining a reverse drive.

After the vehicle, (or other load) has been brought up to a predetermined speed by means of gears 211 and 212, a direct drive between shafts 11 and 204 is established by means of a clutch member 221, provided with a facing 223 which may consist of any suitable material, but which preferably is made of the same material as that employed in the clutch facings previously disclosed. Clutch member 221 is actuated, to cooperate with face 224 formed on member 194, by any suitable speed responsive mechanism. In the present instance, I have disclosed centrifugal means for producing this result.

Member 221 is normally urged toward member 215 by means of a plurality of holdback bolts 225, held in apertures in member 221 by means of threads or by shoulders and upset ends, as shown. Each holdback bolt 225 is encircled by a compression spring 226, which seats at one end directly against member 215, and at the other end against the bolt head. When member 221 is in its retracted position under the influence of springs 226, there is no contact between facing 223 and driving face 224 formed on member 194.

Reaction member 215 is normally urged to the left as seen in Figure 9 by means of a relatively heavy compression spring 227 which seats upon the hub 216 thereof and reacts against the ring 228 which in turn is held against axial movement by means of a split ring 229, sprung into a groove 231 in the shaft 204. Movement of reaction member 215 to the left under the influence of spring 227 is limited by a collar or like spacing member 232, which encircles shaft 204 and is held thereon against axial displacement in any suitable manner, as e. g., by means of the inner ball race of bearing 205. Under the proper speed conditions of shaft 204, member 221 is urged into clutching position against the action of springs 226 by means of a plurality of centrifugal weights 233, provided with lever sections 234 extending through apertures 235 formed in the reaction member 215.

Lever sections 234 carry heads 236 on the ends thereof. Heads 236 cooperate with annular grooves 237 and 238 formed in members 215 and 221 respectively in precisely the same manner as heads 147 of weights 144 disclosed in the device of Figure 1 of the drawings.

From the above description it will be seen that when shaft 204, under the influence of gears 211 and 212, is brought up to a predetermined speed, the weights 233 will pivot outwardly under the influence of centrifugal force and will thrust member 221 to the left against the action of holdback springs 226, and then, when facing 223 contacts clutch face 224, movement of member 221 will be arrested. Upon further outward movement of weights 233, reaction plate 215 will be forced to the right to gradually compress spring 227, thus causing the clutch to take hold smoothly, and the shaft 204 to be ultimately brought up to the speed of shaft 11 in the manner described in connection with the mechanism of Figure 1.

In order to definitely limit the outward movement of weights 233, a flange 241 or the like is formed on the periphery of reaction member 215 against which the weights 233 are adapted to seat when they are disposed in the positions corresponding to fully engaged clutch conditions. Whereas stop members 146 employed in connection with the mechanism illustrated in Figure 1 constitute safety means, the stops 241 in the present instance, in view of the fact that plate 215 is resiliently backed by spring 227, may be effectively employed to arrest the weights 233 in any desired position and thus predetermine the driving pressure exerted thereby.

During the clutch operation, sleeve member 193 and shaft 204 have been urged away from each other by the action of centrifugal weights 233 through the medium of spring 227 and rings 228 and 229, and such tendency has been opposed by thrust bearings 196 associated with shaft 11 and sleeve 193, and also by thrust bearing 205 associated with shafts 11 and 204. In this connection it should be particularly noted that when clutch members 221 and 194 are fully engaged and a oneto-one ratio exists between shafts 11 and 204, the sleeve member 193 and the shaft 11, between which thrust gearing 196 is interposed, are stationary with respect to each other, and shafts 11 and 204 also exhibit no relative angular movement. Therefore, thrust bearings 196 and 205, when the transmission is operating in direct drive, are idle and perform no other function than that of taking the thrust of the centrifugal weights 233. Hence no wear is imposed upon them, and they have a long life under such conditions.

Although reaction member 215, which supports pinion 212, is moved axially during the clutch operation, this movement is small and no interference with the proper operation of pinion 212 is caused. However, if herringbone gears are employed, no axial movement can be allowed and in such an event it is to be understood that shafts 213 may be mounted upon a member rigid with shaft 204, and the clutch mechanism may be disposed to the right thereof so as not to interfere therewith.

Referring to Figure 10 of the drawings, I have disclosed a further modified power transmitting mechanism which is similar in some respects to those previously described. Clutch housing 1 has scecured to the rear face thereof a transmission housing 245 by means of cap screws 246 threaded into flange 247 of housing 245. Housing 245 is likewise provided with an inspection cover 248 and a lubricant drain plug 249. Clutch housing 1 provides a cylindrical bearing support 251 in which a bearing assembly 252 is held by means of a cap member 253 secured to housing 1 with cap screws 254 threaded thereinto. Since the front end of shaft 11 is rotatably mounted in pilot bearing 13 located in the flywheel, the shaft 11 thus is rotatably mounted against angular as well as radial displacement. Cap member 253 closely fits shaft 11 and is provided with oil returning grooves 255 which prevent oil from working along shaft 11 from housing 245 into clutch housing 1.

Disposed in axial alignment with shaft 11, and mounted for rotation in bearings 256 and 257, respectively located in a recess 258 in shaft 11 and in a recess 259 of the housing 245, is a driven shaft 261 upon which is rigidly secured driven member 263 by means of a key or the like.

Shaft 11 is provided with an enlarged portion on which gear teeth 264 are formed. Gear teeth 264 cooperate with pinions 265 which are rotatably supported upon studs 266 which in turn are suitably secured in apertures in member 263. Pinions 265 mesh with internal gear teeth 267 formed on a clutch member 268. Member 268 is provided with a hub portion 269 in which a plurality of cam pockets 273 are formed. A corresponding plurality of overrunning clutch rollers 272 cooperate with the pockets and also with a stationary race member 274 which is keyed or otherwise suitably secured to a supporting sleeve 275 rigidly carried by the housing 245.

Rotation of shaft 11, produced by operation of weights 72 associated with the primary automatic clutch mechanisms, causes pinions 265 to tend to rotate member 268 in an anti-clockwise direction when viewed from the left end of Figure 10. This tendency of member 268 causes rollers 272 to wedge themselves between cam pockets 273 and race members 274, thereby locking member 268 in stationary condition. Pinions 265 are thereby caused to roll in a clockwise direction around the pitch circle of internal gear 267, and accordingly their pivots 266 are caused to take clockwise planetary paths. Since member 263, to which shaft 266 is rigidly secured, is in turn rigidly secured to shaft 261, shaft 261 is thereby caused to rotate at a reduced speed with respect to that of shaft 11.

When shaft 11 reaches a predetermined speed, shaft 261 is accelerated to rotate in unison therewith by means of a clutch member 277 provided with a friction facing 278 which cooperates with a cone-shaped face 279 formed on member 268. Clutch member 277 is actuated by speed-responsive means which in the present instance comprises centrifugal mechanism. In view of the fact that clutch member 277 cooperates with reaction plate 281 and the centrifugal weights and holdback bolts in the same manner as those elements illustrated in Figure 9 of the drawings, they will be given the same reference characters, and the operation thereof will not be repeated. Reaction member 281 is slidably mounted upon shaft 11 for rotation therewith by means of a key 282 or the like and it is urged to the right against a stop member 283 by means of a compression spring 284 which reacts against a ring 285 that is secured against movement axially of shaft 11 by means of a split ring 286, sprung into a groove 287 formed in shaft 11.

When shaft 261 has been brought up to a predetermined speed through the medium of gears 264 and 265, centrifugal weights 233 swing outwardly and cause clutch member 277 to clamp facing 278 against face 279 of member 268 against the action of holdback springs 226. When facing 278 contacts face 279 a torque of small magnitude is transmitted to member 268, and upon further outward movement of weights 233, reaction plate 281 is caused to move to the left against the action of spring 284, thus causing a pressure to be gradually built up therein and also between facing 278 and clutch face 279.

When weights 233 have reached their outer limit of movement, pinions 265 will then be disposed between two members which are rotating in unison, namely member 268 and shaft 11. Therefore they will not rotate about their axes, but will drive the shaft 261.

In view of the fact that in this instance the secondary clutch mechanism is mounted upon shaft 11, instead of upon the driven shaft as in the previously described clutch mechanisms, weights 233 are designed with smaller mass than weights 72 of the primary clutch mechanism, so that they will not swing outwardly in response to centrifugal force until the phase of operation through the gear reduction has been terminated. During this clutch operation, shafts 11 and 261 have been urged away from each other by action of weights 233, and in order to take care of this thrust, hub 269 of member 268 is provided with a combined radial and thrust bearing assembly 291 which serves to rotatably support member 268 and to also oppose axial thrust exerted thereon. Bearing assembly 291 therefore transmits thrust from member 268 to shaft 261 from whence it may be transmitted either to shaft 11 through the medium of combined radial and thrust bearing 256, or to the housing assembly by way of the bearing 257.

Referring now to Figure 11 of the drawings, the automatic power transmitting mechanism disclosed in Figure 10 is shown with a modified form of mechanism for directly coupling shafts 11 and 261 when the proper torque-speed conditions exist.

Secured to shaft 11, as by a key 301, is a driving member 302 in the form of a disc having a peripheral flange 303 and an intermediate offset portion in which member 268 is nested to obtain compactness. Member 302 has chordal slots 304 through which extend the lever sections of a plurality of centrifugal weights 305. Weights 305 are similar in structure and function to those disclosed in Figure 10, and they cooperate in a similar manner with an annular recess 306, formed in the automatic plate 307, to cause clutching and declutching movements.

Automatic plate 307 is urged toward member 302 by means of a plurality of shouldered holdback bolts 308 which are slidably received in apertures 309 in member 302 and are threaded into automatic plate 307. Each bolt 308 is encircled by a compression spring 310 which seats at one end against the head thereof, and reacts against member 302. Automatic plate 307 is therefore urged toward member 302 and clamps the heads of weights 305 thereagainst, thus causing weights 305 to be normally urged into their inner or neutral positions. Weights 305 are further provided with recesses 311 so that they may operate without interference from holdback bolts 308.

Disposed in axial alignment with automatic plate 307 is an annular disc 312, which has the inner periphery thereof riveted to the flange of a splined hub 313. Hub 313 is axially slidable on splines 315 formed on member 268. Each side of disc 312 is provided with an annular facing 314, similar to those previously described. Axial movement of automatic plate 307, in response to operation of weights 305, causes disc 312 to be clamped between it and a backing plate 316, for causing member 268 to be accelerated to rotate ultimately in synchronism with shaft 11.

Backing plate 316 is connected to member 303 for rotation therewith and for movement axially thereof by any suitable means, (not shown), and is under the influence of a plurality of compression springs 317 which seat thereagainst. The springs also react against a cover plate 318, secured to flange 303 of member 302 by machine screws 319 or the like. Movement of plate 316, to the left in Figure 11 in response to the action of springs 317, is limited by bolts 321 which are slidably disposed in apertures in plate 318 and threaded into plate 316. Bolts 321 are so designed, that when weights 305 are in their inner or neutral position, clearances will exist between the driven disc 312 and the plates 307 and 316 thereby relieving facings 315 of driving pressure and disconnecting members 302 and 268. If desired bolts 321 or cover 318 may have adjusting means associated therewith for adjusting plate 316 toward or away from automatic plate 307 for compensating for the influence of wear upon the thickness of facings 315.

When shaft 261 has been accelerated through the medium of gear 264 and pinions 265 to a speed corresponding to a speed that is sufficiently high for the prime mover to deliver adequate power to cause further acceleration of shaft 261 in direct drive, weights 305, in response to centrifugal force pivot outwardly about their fulcrums and act upon automatic plate 307 to cause it to move to the right against the action of holdback springs 310 to clamp plate 312 between it and backing plate 316, thus initiating clutch engagement. Further outward pivotal movement of weights 305 causes pressure to be built up in springs 317, and torque to be transmitted from shaft 11 to member 268. Member 268 is accordingly accelerated, because overrunning clutch rollers are now unlocked and permit clockwise rotation of member 268 when viewed from the left end of Figure 11. When the speed of shaft 11 becomes sufficiently high, weights 305 pivot outwardly to their limits and make contact with the face of member 302, at which time the pressure exerted thereby is sufficiently great to cause a non-slipping drive to be established between shaft 11 and member 268; and in view of the fact that pinions 265 are now disposed between two members that are rotating in unison, member 263, upon which they are supported, is likewise caused to rotate in unison with shaft 11. A direct drive between shafts 11 and 261 is thus automatically established.

It should be particularly noted that during the operation that has just been described, weights 305 do not cause shafts 11 and 261 to be urged toward or away from each other, nor is member 268 urged against the housing, because the entire clutch mechanism, with the exception of plate 312, is supported upon shaft 11. Plate 312, in response to movement of automatic plate 307, cannot exert axial thrust upon member 268 because it is splined thereto, and bearing assembly 291 is therefore merely called upon to sustain radial loads.

The secondary automatic clutch incorporated in the power transmitting mechanism just described may be substantially isolated from the lubricant contained in housings 245 and 130, thereby enabling the clutch mechanism to function as a dry or self lubricated clutch. To this end the radial face of member 268 is provided with an annular groove 323 in which is fitted a suitable packing or sealing member 324 for cooperation with the radial face of member 302, and hub 369 is similarly provided with a groove 325 containing a sealing member 326 for cooperation with the end wall of housing 245, which is preferably ground and polished to provide a smooth surface.

In this arrangement the members 268 and 302 define a lubricant chamber and it is contemplated that a portion of the lubricant contained in housing 130 will work past bearing assemblies 257 and 291 into this chamber for lubricating the various parts contained therein. Therefore pinions 265, shafts 266 and bearing assemblies 256, 257 and 291 may be adequately lubricated, while the sealing means just described substantially prevents the introduction of lubricant into housing 245, and operation of the automatic clutch in a substantially dry condition is assured,—especially in view of the fact that during direct drive operation there is no reactive motion between packing member 324 and the cooperating face of member 302. If desired, an initial supply of lubricant may be introduced into the mechanism-containing chamber by means of a suitable fitting (not shown) tapped into member 268.

Referring now to Figure 12 of the drawings, a further modified form of automatic power transmitting mechanism is disclosed, which is so designed that the secondary automatic clutch mechanism may be installed in the housing containing the primary automatic clutch mechanism, and thereby may operate as a dry clutch. The secondary automatic clutch mechanism employed in this form of the invention is similar in some respects to the primary clutch mechanisms described in connection with Figures 1, 9, 10, and 11, and will be described in detail hereinafter.

With continued reference to Figure 12, a transmission housing 331 is secured to the rear face of the clutch housing 1 and is provided with an inspection cover 333 and lubricant drain plug 334. Housing 1 is provided with a cylindrical bearing support 335, in which is journaled, in bearing assemblies 330, sleeve 337 of a clutch disc 338. Passage of lubricant from housing 331, between sleeve 337 and bearing support 335, into housing 1 is prevented by means of a plate 339 having a packing gland 341 therein provided with suitable packing material 342 cooperating with the outer surface of sleeve 337. Plate 339 is secured to housing 1 in any suitable manner, as by machine screws 343. The intermediate shaft 11 is rotatably supported within the sleeve 337 by bearing assemblies 344, and therefore the sleeve 337 and the shaft 11 are rotatably mounted in housing 1, and may rotate relatively to each other. Introduction of lubricant into housing 1, between shaft 11 and sleeve 337, is prevented by means of a plate 345 secured in sleeve 337 and carrying a packing ring 346.

Disposed in axial alignment with shaft 11, and mounted for rotation in bearing assemblies 349 and 351, carried by the shaft 11 and the housing 331 respectively, is a driven shaft 354. The rear end of shaft 11 is enlarged and in toothed engagement with pinions 356 supported on shafts 357. These shafts are rotatably journaled at one end in a carrier or cage member 358 secured to shaft 354 by key 359 or the like, and at their other ends are journaled in a similar cage member 361, rigidly secured to sleeve 337 in any suitable manner. Although cage members 358 and 361 may be entirely independent of each other and function satisfactorily, I prefer to design them as shown, with portions intermediate the pinions 356 securely clamped together by means of bolts 362 and nuts 363, thus to constitute a rigid structure assuring perfect alignment of the journals for the opposed ends of shafts 357. At the same time any forces set up as the result of any tendency of the cages to rotate relatively to each other are imposed upon, and transmitted by bolts 362, instead of shafts 357, thus assuring free rotation of shafts 357 in their bearings and also maintaining pinions 356 in proper association with gear 355.

Pinions 356 also mesh with internal gear teeth 365 formed in a member 366. Overrunning clutch rollers 367 cooperate with cam faces 368 formed in member 366, and with a race member 369 supported on the sleeve-like portion 371 of the housing 331, in precisely the same manner as in the corresponding organizations disclosed in Figures 10 and 11 of the drawings, to prevent anti-clockwise rotation of member 366 while permitting clockwise rotation thereof (when viewed from the left-hand side of Figure 12).

A torque amplifying coupling is automatically established between shafts 11 and 354 precisely in the same manner as in the previously described forms. Cage member 361, sleeve 337, and clutch member 338, by virtue of their rigid connection with cage 358, are rotated in unison with shaft 354, driven by gear 355 and pinions 356. The secondary automatic clutch mechanism employed in this form of the invention is supported upon member 338 and hence is responsive to driven shaft speed. This secondary clutch is similar in many respects to the primary clutch and is constructed as follows.

Shaft 11 has a splined portion 414 receiving a splined hub 415 provided with a flange 416 to which is secured a disc 417. The sides of disc 417 are provided with facings 419 and 420 which preferably consist of a material like that described for use in the primary automatic clutch.

Disc 417 along with hub 415 and facings 419 and 420 constitutes the driving member. The facing 419 cooperates with the flat face of member 338 to be engaged and frictionally driven thereby. Facing 420 cooperates with a plate 422, which will be hereinafter termed the automatic plate for the reason that it is automatically actuated and is adapted to engage and clamp member 417 between it and the flat face of member 338.

Plate 422 is driven with member 338, and is permitted to move axially thereof for clutching and declutching purposes, by means of key slots 423 formed therein, which preferably are disposed at 120° intervals around the periphery of plate 422. Each slot cooperates with a finger 424 formed on and projecting inwardly from one end of a bracket 425 that is secured to the member 338 by cap screws 426. Automatic plate 422 has flat sides 427 which allow brackets 425 to be disposed with their ends adjacent the periphery thereof.

Disposed parallel to automatic plate 422, and also mounted for rotation with member 338 is a plate 428, which will hereinafter be termed the reaction plate because it takes the reactions of the automatic weights in a manner presently to be described. The plates 422 and 428 are urged toward each other by compression springs 432 which encircle the bolts 429.

Spaced ears 434 (Figures 13 and 15) are formed adjacent enlarged apertures 435 in the reaction plate 428 at approximately 120° intervals. Ears 434 extend into recesses 436 formed in automatic plate 422.

A sheet metal plate 441 is provided which overlaps reaction plate 428 as shown in Figure 12 and which receives the reactions of a plurality of springs 445. The outer ends of springs 445 are received in and seat against the bottoms of cup members 446, which are flanged and are received in apertures in an annular plate 447. Plate 447 is apertured at approximately 120° intervals about its periphery and slidably receives cap screws 449, anchored in the plate 441. The heads of cap screws 449 limit the movement of plates 441 and 447 away from each other. The face of plate 447 bears against curved faces 450 formed on levers 451.

The outer end of each lever 451 is journaled on a pin 452 which in turn is held in a saddle member 453, each saddle member 453 being secured to the reaction plate 428. Each lever 451, intermediate its ends, is apertured and journaled upon a pin 457 which is secured in the outer end of a link member 458. The other end of each link member 458 extends through apertures in plate 428 and has a pin 459 secured therein and journaled in a lug 461, formed upon the central portion of one of the saddles 425. Levers 451 are always held under stress in contact with plate 447 by the action of a plurality of relatively light compression springs 465, corresponding to springs 65 of the primary clutch mechanism, interposed between reaction plate 428 and member 338. In order to stiffen reaction plate 428 and avoid excessive flexing thereof in operation, the metal thereof is provided with pairs of radial dished-out portions 468 and chordal dished-out portions in the region of each lever assembly.

The rear face of automatic plate 422 has an annular recess 471 providing a flat bottom face against which the weights 472, fulcrum and react to cause clutch engagement. Each centrifugal weight preferably consists of a lever section 473 which is of substantial width and received in the rectangular recesses 474 and 474' formed respectively in reaction plate 428 and plate 441. Levers 473 carry at their extremities heads 475, each of which is provided with a flat face 476 that normally abuts the bottom face of annular recess or groove 471 in automatic plate 422 when the engine or prime mover is operating at idling speed or is stationary. The reaction face 477 of each head 475 normally abuts the plate 441 and is designed for fulcruming engagement therewith during operation of the weights. Referring to Figure 13, it should be noted that when plates 422, 428 and 441 are separated, heads 475 of weights 472 may be lifted out of recess 471, and the weights removed from the mechanism.

As shaft 354 and member 338, which is directly coupled therewith is accelerated, through the medium of gear 355 and pinion 356, to a speed at which the prime mover can deliver sufficient torque to cause acceleration of shaft 554 in direct drive, which in turn is predetermined by the mass of weights 472 and the design of springs 432 and 445, each weight 472 will gradually swing outwardly about its edge 478 as a pivot in response to centrifugal force to cause clutch engagement.

To definitely limit the swinging movement of each weight assembly in its outward direction a pair of fingers 482 is struck out of plate 428 adjacent each holdback bolt 429.

As weights 472 swing outwardly they react against plate 441 and cause pressure to be gradually built up in springs 445 and this gradual build up of pressure in springs 445 causes a torque of gradually increasing magnitude to be transmitted from shaft 11 to cage members 358 and 361. When shaft 354, and member 338, connected thereto, attain sufficient speed, the weights 472 move to their outermost limits in contact with fingers 482, and the driving and driven members will then be disposed in firm driving engagement, with no slippage between them, and the pinion carrier and member 366, as well as shafts 11 and 354, will then rotate in unison. Upon initiation of this operation, overrunning clutch rollers 367 release member 366 for clockwise rotation in response to acceleration of pinion cages 258 and 261, caused by rotation imparted thereto by member 417.

Although plate 441 and reaction plate 428 are made of comparatively light gauge sheet metal, heads 475 of weights 472 reacting against plate 441, do not cause harmful distortion of either plate because heads 472 react against plate 441 in a region thereof that is overlapped by plate 428, thus affording two thicknesses of material for cooperation with heads 475 to distribute the pressure created thereby. I prefer to construct reaction plate 428 of any suitable ordinary sheet metal, and plate 441 of sheet metal that has been hardened in any well known manner so that any wear thereof caused by the slight sliding action that does take place between heads 475 and plate 441, will be negligible.

The operation of the described mechanism of Figures 12-15 is precisely the same in most respects as that of the similar mechanisms previously described, the major differences being pointed out above. Likewise, the advantages of many common structural features and arrangements are the same. The complete operation should therefore be understood by reference to the description of Figure 1 and to the following added subject matter, part of which deals with all forms of the invention.

It should be observed that the torque amplifying apparatus of Figure 12 is so designed that every moving part may be effectively lubricated by maintaining a suitable lubricant level in housing 331, and at the same time, the secondary clutch mechanism is completely isolated from such lubricant, thereby permitting it to operate as a dry clutch. Although the secondary clutch mechanism in this form of the invention is responsive to the speed of shaft 354 through its connection therewith through sleeve 337 and cages 361 and 358, obviously, if desired, it may be designed to operate in accordance with the speed of shaft 11 by mounting member 338 upon shaft 11 and member 417 upon sleeve 337.

It is also contemplated as part of this invention that the automatic power transmitting mechanisms illustrated in Figures 1, 9, 10 and 11 may be modified for braking operation in precisely the same manner as just described for Figure 12, by applying suitable braking means to members 97, 194, 268 and 268 respectively of these mechanisms.

Referring again to the several mechanisms illustrated in Figures 1, 9 and 12 of the drawings, the secondary automatic clutch mechanisms thereof operate solely in response to the speed of rotation of shafts 104, 204 and 354 respectively, which may for all purposes be considered as the final driven shafts because the torque amplifying coupling is disposed between them and the prime mover. The secondary clutch mechanisms disclosed in Figures 10 and 11 of the drawings do not respond directly to the speed of the driven shafts, but in view of the fact that they are carried by intermediate shaft 11, which is definitely coupled with the driven shaft through the interposed gear mechanism, they therefore operate in accordance with the speed of the driven shafts. This is a highly desirable result for the reason that operation of such secondary clutch mechanisms is entirely independent of the speed of rotation of the prime mover, but is dependent upon the speed of the final driven shaft, and after all, since the speed of the final driven shaft or the load is the essential factor in the operation of the secondary automatic clutch mechanism, such operation should take place when the load has been accelerated to a speed where the prime mover has developed sufficient power to cause further acceleration of the load without the aid of torque amplifying mechanisms. Therefore secondary clutch operation should not depend solely upon the speed of the prime mover, but should be correlated with the speed of the load and the prime mover.

Moreover the present organization allows the holdback springs and centrifugal weights of the secondary clutch mechanisms to be of substantially similar design to those employed in the primary clutch mechanism, whereas, if the secondary clutch mechanism were dependent upon, and wholly responsive to the speed of the prime mover, it would be necessary to specially design the springs and weights for operation at a higher speed than that of the primary automatic clutch mechanism driven by the prime mover. Otherwise, upon acceleration of the prime mover, both clutch mechanisms would operate almost simultaneously to directly couple the prime mover with the intermediate shaft 11 and the final driven shaft, and the torque amplifying coupling therefore could never be utilized.

In a vehicle provided with power transmitting mechanisms of the character that I have disclosed, if it is desired to start the vehicle on a grade, the engine is accelerated and the weights 72 of the primary automatic clutch mechanism operate to establish a slipping torque transmitting coupling between the prime mover and the intermediate shaft. Rotation of the intermediate shaft, through the medium of the interposed gearing, causes an amplified torque to be transmitted to the driven shaft. Through the slipping drive coupling existing between the prime mover and the load, the prime mover is allowed to accelerate and operate efficiently on a relatively high point on its speed-torque curve to develop adequate power to start the vehicle, even though the interposed gear mechanism may have only a low torque amplification. During this operation, the secondary automatic clutch mechanism is inactive since it relies for its actuation upon the speed of the load, and the only connection existing between the prime mover and its load is that established by the interposed gearing, which supplies sufficient torque amplification to enable the engine to effectively handle the load under these conditions.

By way of a concrete example, assuming that any one of the various novel transmission mechanisms herein disclosed is incorporated in a motor vehicle, and the transmission gearing has a reduction of 2 to 1, and the primary clutch mechanism initiating operation at an engine speed of 500 revolutions per minute, completing its operation at an engine speed of 1000 revolutions per minute, a non-slipping drive with torque amplification is thereby established between the engine and the rear wheels when the engine is operating at 1000 revolutions per minute. With normal rear axle gear ratios, this results in a vehicle speed of 10 miles per hour, although it is to be understood that completion of primary clutch operation may take place at a higher or lower vehicle speed, depending upon whether the vehicle is ascending or descending a grade or proceeding on a level surface.

Under these conditions the secondary clutch mechanism, due to the fact that it is actuated in accordance with the speed of the driven shaft and vehicle wheels coupled thereto, may be designed to operate to directly couple the engine and rear wheels at any desired vehicle speed, for instance 15 miles per hour, and such operation is therefore entirely independent of speed fluctuations of the engine.

On the other hand, if the secondary automatic clutch mechanism were responsive to the speed of the driving member and was designed to initiate operation at a vehicle speed of 15 miles per hour, corresponding to an engine speed of 1500 revolutions per minute, and to complete its operation at 1800 revolutions per minute, this would not result in a vehicle speed of 18 miles per hour, because a direct drive would then be established, and the engine speed of 1800 revolutions per minute would result in a vehicle speed of 36 miles per hour. Therefore, with mechanisms wherein both primary and secondary clutch mechanisms are responsive to the speed of the driving members, a slipping drive is initiated at a vehicle speed of 15 miles per hour and is not terminated until the speed of 36 miles per hour is attained, thereby effecting a direct coupling between the driving and driven members only after an extremely prolonged slipping operation. Accordingly, while I may make both the primary and secondary clutches responsive to the speed of the driving member and such constructions are within the scope of my invention, the preferable form of my invention utilizes mechanisms wherein the primary clutch mechanisms are responsive to the speed of the driving member, and the secondary clutch mechanisms are responsive to the speed of the driven member.

Referring to all of the power transmitting mechanisms that have been disclosed, it is seen that as soon as the prime mover is accelerated substantially above idling speed, a coupling is automatically established between the prime mover and the load, and while it is usually desirable that such action occur, there are times when it is desired to disconnect the prime mover from the load for the purpose of allowing the prime mover to operate substantially or well above idling speed in order to allow the prime mover to "warm up," (if it is an engine of the internal combustion type), or to effect adjustment of the carburetor thereof. I preferably permit this disconnection by providing the reversing mechanism contained in housing 130 with a neutral position, between forward and reverse drive positions, wherein the driven transmission shaft is disconnected from the final driven member or load. Lever 131 then will be capable of assuming three operative positions, namely, forward driving position, neutral position, and reverse driving position. Accordingly, with the transmissions illustrated, the prime mover and load may be disconnected, regardless of the speed of the prime mover, by moving lever 131 into its neutral position. It is to be understood, however, that this operation may be effected in any other similar manner without departing from the spirit of the present invention,—as for instance, by auxiliary jaw or friction clutches suitably interposed between elements of the mechanism to disconnect the prime mover and load.

Another manner in which disconnection of the prime mover and load may be effected resides in the provision of manual declutching mechanism for manually declutching the primary or secondary automatic clutch mechanisms, and in Figure 16 of the drawings, I have disclosed a throwout mechanism associated with the primary automatic clutch mechanism of Figure 1 of the drawings, although it is to be understood that the secondary clutch mechanism could likewise be provided with declutching means.

In Figure 16,—cooperating with curved faces 501 formed on the inner extremities of levers 51 is the flat face of a ball race 502, which cooperates with anti-friction balls 503 disposed therebetween and a similar ball race 504. Ball races 502 and 504 are held in loosely assembled relation with respect to each other by means of a retainer member 505. Ball race 504 is rigidly mounted upon a sleeve 506, which is slidably mounted upon a hollow supporting member 507. The latter preferably is rigidly mounted in housing 1 in any suitable manner in axial alignment with the clutch mechanism and prime mover shaft 5 when the clutch is assembled, and designed to provide a close sliding fit with the sleeve 506. Supporting sleeve 507 preferably is spaced substantially from, and is independent of the intermediate shaft 11. Sleeve 506 is provided with a tapped bore 509 into which a grease fitting 511 of well known construction is screwed. Bore 509 communicates with an auxiliary extending passage 512 formed in sleeve 506 so that lubricant introduced through passage 509 provides lubrication for axial movements of sleeve 506 and also provides lubrication for the bearing assembly through passage 512 and passage 513 connecting with the bearing.

To prevent rotation thereof sleeve 506 may be keyed or splined upon supporting sleeve 507 so that it may slide axially of supporting sleeve 507 for declutching movements. Formed on opposite sides of sleeve 506 are lugs 516 which cooperate with throwout fingers 517 mounted on throwout shaft 518 in well known manner to effect declutching movements of sleeve 506. Shaft 518 is preferably journaled in and extends outwardly of housing 1 and carries on the end thereof a conventional clutch pedal (not shown), for imparting oscillation to shaft 518. When this throwout mechanism is employed in connection with the primary automatic clutch mechanism illustrated in Figure 1, springs 65 and shouldered studs 49, which limit the movement of plates 28 and 47 away from each other, are omitted from the mechanism, thus permitting springs 45 to urge automatic plate 22 toward engaged position, and to thereby urge levers 51 into engagement with the face of the throwout bearing assembly at all times. The parts are held, however, during normal driving operations in the positions shown in Figure 1 by means of a latch mechanism associated with the clutch pedal, and such latch mechanism may take the form of that disclosed in copending application Serial Number 595,184 filed February 25, 1932.

If it is desired to operate the prime mover substantially above idling speed, the clutch pedal is depressed, causing the throwout assembly to move to the left and producing similar movement of the inner ends of levers 51. Movement of levers 51 in this manner causes automatic plate 22 and reacting plate 28 to be moved as a unit from the position shown in Figure 1 to a position further to the right, so that a substantial clearance exists between the face of automatic plate 22 and the driven plate. Accordingly, when the prime mover is accelerated, weights 72 operate in response to centrifugal force and cause separation of plates 22 and 28 in the manner previously described, but the movement imparted to automatic plate 22 under these conditions is insufficient to cause it to engage the driven plate due to the substantial clearance established between the two by the declutching mechanism, and disconnection of the prime mover and the load is thereby maintained. If desired, a second latch may be associated with the clutch pedal for holding it in its fully depressed position, for maintaining the primary clutch mechanism in declutched condition.

The clutch pedal may be operated in this manner at other times to disconnect the prime mover from the load, should the necessity for such operation arise.

With the parts of the primary automatic clutch mechanism in the positions they assume in Figure 1, if it is desired to effect engagement thereof when the prime mover is only operating at idling speed or is stationary, the first mentioned latch mechanism may be released to allow the clutch pedal to move into its fully retracted position. This retraction of the clutch pedal allows the throwout bearing assembly to move to the right under the influence of springs 45, which, acting through levers 51, bring reaction plate 28 and automatic plate 22 to the left of the positions in which they are disclosed in Figure 1, with automatic plate 22 in driving engagement with the driven member. A direct coupling is thus established between the prime mover and shaft 11. Such operation is particularly desirable when the above described power transmitting mechanisms are installed in motor vehicles, for the reason that when the motor is cold and the battery is low, it is sometimes desirable to connect the engine with the rear wheels of the vehicle so that the vehicle may be towed or coasted in order to turn the engine over. Although during this operation the driven shaft is temporarily the driving member and is tending to drive the planetary pinions in a clockwise planetary path, which results in overrunning of the internal gear and failure thereof to be locked in stationary condition so as to cause the planetary pinions to impart rotational effort to the intermediate shaft, as previously explained, when such coasting or towing operations are being carried out, a coupling is nevertheless established between the engine and rear wheels in the manner now to be described.

This clutching operation is entirely automatic, because at low vehicle speed, when the vehicle wheels and propeller shaft are functioning as the driving members, tending to turn the engine over through manual engagement of the primary clutch mechanism, such tendency is ineffective to produce this result because the overrunning clutch operates to allow the internal gear to overrun and effect disconnection of the intermediate and driven shafts. When the vehicle, in response to coasting, towing, or the like, is accelerated sufficiently, the centrifugal weights of the secondary automatic clutch mechanism operate to cause engagement thereof and thereby couple the driven and intermediate shafts, thus completing a direct connection between the driven shaft and the engine.

It is important to note that, should the engine stall from lack of fuel or any other cause, the vehicle can be pulled out of any dangerous location, such as a grade crossing or the like, by propelling the vehicle with the starting motor.

As described in connection with the mechanism illustrated in Figure 1 of the drawings,—in practice, the secondary automatic clutch mechanisms disclosed in Figures 9, 10, 11 and 12 of the drawings, are preferably so designed that complete clutch engagement is relatively rapid, so that the entire engaging operation, terminating in full engagement, takes place over a speed range of approximately ten to twelve percent or less, or approximately one-tenth of the speed range in which slipping drive conditions exist in the respective primary clutch mechanisms. Thus the opportunity for undesirably prolonged slipping during load conditions under which the secondary clutch is in slipping drive engagement, as might occur in practice, is reduced to a minimum. The chief requisite in any case is that the transition period,—during which there is a virtually decreasing torque multiplication between the time that the secondary clutch starts to take hold and the time that it is fully engaged without any slip,—must be sufficiently prolonged to permit smooth changes from low gear to direct drive, and vice versa. The smoothness of this change is made possible by the differentiating action of the gear and pinion mechanism during the transition period. Accordingly, the range of figures just given are approximate, and apply particularly to the disclosed mechanisms, which are designed for use in motor vehicles of the pleasure car class. It will be readily appreciated, that in heavy duty industrial or like drives, the above given slippage figures may be varied by properly designing the weights and holdback springs of the secondary clutch mechanisms to meet the requirements of the particular installation involved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. An automatic power-transmitting mechanism comprising a driving member adapted to be operatively coupled to a power source; a driven member adapted to be coupled to a load; means for automatically establishing a slipping, torque-amplifying, power-transmitting coupling between said members when said driving member reaches a predetermined speed, and thereafter, upon further acceleration of said driving member, for automatically establishing a non-slipping, torque-amplifying, power-transmitting coupling between said members; said means comprising a speed responsive friction clutch having means for causing it to smoothly slip and transmit power during the first phase of its operation in response to acceleration of said driving member and means for automatically bringing said driving and driven members into synchronism.

2. An automatic power-transmitting mechanism comprising a driving member adapted to be operatively coupled to a prime mover; a driven member adapted to be coupled to a load; a torque-multiplying mechanism operably associated with said driving and driven members, means for establishing a slipping, power-transmitting coupling between said members through said torque-multiplying mechanism when said driving member reaches a predetermined speed, and for maintaining said slipping coupling throughout a substantial speed range of said driving member, thereby allowing said prime mover to accelerate sufficiently to develop adequate torque to accelerate said load, and means for automatically bringing said members into direct drive, when said prime mover has accelerated sufficiently to develop adequate power to handle said load without the aid of said torque-multiplying mechanism, said torque multiplying mechanism having a torque multiplication of such magnitude that when the transition from torque-multiplying to direct drive is initiated, said driving and driven members are rotating at speeds which are not greatly variant.

3. In an automatic transmission; a driving member adapted to be coupled to a prime mover; a driven member adapted to be connected to a load; a torque multiplying mechanism operably associated with said members; means comprising a primary automatic clutch mechanism for automatically establishing a torque-transmitting connection between said members when said driving member reaches a predetermined speed, said clutch mechanism having relatively great inherent period of slip, whereby said prime mover is allowed to accelerate sufficiently to develop adequate power to handle said load; and a secondary automatic clutch mechanism having a relatively small period of slip for automatically, and relatively rapidly bringing said members into synchronism when said load is accelerated sufficiently to be handled by said prime mover in direct drive.

4. An automatic power-transmitting mechanism comprising a driving member adapted to be operatively coupled to a prime mover; a driven member adapted to be coupled to a load; means for automatically establishing a slipping, torque-amplifying power-transmitting coupling between said members when said driving member reaches a predetermined speed and thereafter, upon further acceleration of said driving member, for automatically establishing a non-slipping torque-amplifying, power-transmitting coupling between said members; and means for automatically establishing a slipping, power-transmitting connection manifesting a virtually decreasing torque-multiplication between said driving and driven members when said driving member and said load attain sufficient speed to allow said prime mover to develop increasing power for ultimately bringing said driving and driven members into synchronism.

5. In sub-combination, a housing; an intermediate member; a driven member adapted to be operably coupled to a load; planetary gear mechanism disposed in said housing and normally connecting said intermediate and driven members for the transmission of power therebetween; means providing lubrication for said planetary gear mechanism; frictional clutch means located in said housing and closely associated with said gear mechanism for automatically establishing a direct coupling between said intermediate and driven members when said load reaches a predetermined speed, and means for isolating said gear lubricant from said clutch means, comprising stationary partition means dividing said housing into a gear chamber and a chamber for said clutch means, whereby the latter may operate as a dry clutch.

6. In an automatic power-transmitting mechanism a power-transmitting member; a driven member adapted to be operably coupled to a load; a cylindrical rotatable element operably associated with said members and having internal gear teeth thereon; a gear provided on said transmitting member and nested within said cylindrical element; planetary pinions cooperating with said internal gear teeth and said gear and rotatably carried by said driven member; and speed responsive means adapted to apply rotative efforts to said elements radially beyond the teeth thereof for bringing said cylindrical element and said driven member into synchronism when said driven member reaches a predetermined speed, to thereby effect a direct coupling between said members.

7. The mechanism set forth in claim 6 wherein said speed responsive means is associated with, and responsive to the speed of said transmitting member.

8. In sub-combination, a member adapted to have rotational efforts imparted thereto; a driven member adapted to be operably coupled to a load; means for establishing a torque-amplifying coupling between said members; means for automatically establishing a direct coupling between said members when said load is accelerated to a predetermined speed, said direct coupling means comprising a clutch mechanism reacting against one of said members, and acting upon one of the elements of said torque-amplifying means, and means for transmitting the axial thrust caused by the action of said clutch mechanism to said member against which said clutch mechanism reacts, said one element and said one member being relatively rotatable.

9. The mechanism set forth in claim 8 wherein said thrust transmitting means comprise bearing assemblies operably associated with said members and said element, whereby, when said members are directly coupled, said bearing assemblies merely function statically to transmit thrust and wear thereof under such conditions is avoided.

10. In an automatic transmission, in subcombination, a driving member; a driven member; a torque-multiplying mechanism, having an internal gear, operably associated with said members and adapted to transmit power therebetween; means for establishing a direct drive between said members and for rendering said torque-multiplying mechanism inoperative to transmit power from said driving member to said driven member, said means comprising an automatic clutch device adapted to transmit rotative efforts from said driven member to said internal gear.

11. The device set forth in claim 10, wherein said automatic clutch device is adapted to transmit rotative efforts from said driven member to said internal gear and is responsive to the rotative speed of said driven member.

12. In an automatic transmission, a driving member; a driven member; a rotatably mounted element having gears rotatably carried thereby and adapted to establish a torque-multiplying connection between said members when it is rotating at a speed lower than that of said driving member; and adapted to directly couple said members when it is rotating synchronously with said driving member; and means for automatically bringing said element into synchronism with said driving member, comprising a driving plate; a driven plate, a reaction member; speed-responsive means for forcing said plates into frictional engagement; and resilient means for taking the reaction of said speed-responsive means, to thereby establish a yielding engagement pressure between said plates when they are engaged under the influence of said speed-responsive means.

13. In an automatic transmission, in subcombination, axially aligned driving and driven members; a supporting structure having planet gears journalled therein, said supporting structure being rotatably journalled and coupled to said driven member and adapted to establish a torque-multiplying connection between said members; and speed-responsive means adapted to transmit power directly from said driving member to said driven member through said structure when said driven member attains a predetermined speed, said supporting structure and said speed-responsive means being disposed in axially spaced relation and said supporting structure being located between said speed-responsive means and the adjacent ends of said members.

14. The mechanism described in claim 13, together with means for disconnecting the torque-multiplying drive when said speed-responsive means is actuated.

15. The mechanism described in claim 13, wherein said supporting structure is provided with a sleeve portion, and said driving member is rotatably journalled within said sleeve portion.

16. The mechanism set forth in claim 13, wherein said supporting structure comprises two mating cage members having aligned apertures therein, and said planet gears are supported on shafts extending through said apertures.

17. The device set forth in claim 13, together with an orbital gear meshing with said planet gears and having a hub portion within which said driven shaft extends.

18. The device described in claim 13, together with an orbital gear meshing with said planet gears and having a hub portion within which said driven shaft extends, and a one-way clutch associated with said orbital gear adapted to normally lock the same against rotation in one direction.

19. In an automatic transmission, in subcombination, driving and driven members; a torque-varying mechanism operably associated with said members and adapted to transmit power therebetween; means for controlling said torque-varying mechanism comprising a rotatably mounted element having a cylindrical outer surface; means adapted to restrain said element against retrograde rotation; and means for imparting forward rotative efforts to said element comprising at least one clutch plate splined to the outer cylindrical surface of said element.

20. In an automatic transmission, in subcombination, driving and driven members; a torque-varying device operably associated with said members and adapted to transmit power therebetween, means for controlling said torque-varying device comprising a rotatably supported element having a cylindrical portion; means adapted to restrain said element against retrograde rotation; and means for transmitting rotative efforts from one of said members to said element comprising at least one clutch plate encircling the cylindrical portion of said element; means for coupling said plate to the outer surface of said cylindrical portion and yet permitting free relative axial movement thereof; a rotatable driving element having a surface adapted to frictionally cooperate with said plate; and means responsive to the speed of said driving element, for forcing said driving element into engagement with one side of said plate.

21. The mechanism described in claim 20, together with a second driving element having a surface adapted to cooperate with the other side of said plate.

22. The mechanism described in claim 20, wherein said clutch plate is adapted to transmit rotative efforts from said driving member to said rotatable element.

23. The mechanism described in claim 20, together with resilient means for establishing a yielding engagement pressure between said driving element and said clutch plate when they are engaged under the influence of said speed-responsive means.

24. In an automatic transmission, in subcombination, driving and driven members; a torque-varying mechanism operably associated with said members and adapted to transmit torque therebetween; means for controlling said torque-varying mechanism and for causing the same to tend to bring said members into synchronism, and means, having a moment of inertia of large magnitude as compared with that of said mechanism, associated with said first mentioned means for exerting a steadying influence upon its actuation, and for insuring smooth acceleration thereof.

25. The mechanism described in claim 24, wherein said last named means comprises an automatic clutch having a flywheel-like member connected to and adapted to rotate synchronously therewith.

26. In an automatic transmission, in subcombination, driving and driven members; a torque-multiplying mechanism operably associated with said members and adapted to normally establish a power-transmitting connection between said members, and means adapted to transmit rotative efforts from one of said members to an element of said torque-multiplying mechanism and to thereby tend to establish a one-to-one driving ratio between said members when one of said members attains a predetermined speed, comprising a frictional member; a resiliently backed reaction member associated with said frictional member, and speed-responsive mechanism adapted to act against said frictional member and react against said reaction member and force said frictional member into frictional engagement with said torque-multiplying mechanism element.

27. The mechanism described in claim 26, wherein said speed-responsive mechanism is responsive to the speed of said driven member.

28. The mechanism described in claim 26, wherein said frictional member is adapted to transmit rotative efforts from said driven shaft to said torque-multiplying mechanism element.

29. The mechanism set forth in claim 26, wherein said frictional member is adapted to transmit rotative efforts from said driving member to said torque-multiplying mechanism element.

30. The mechanism described in claim 26, wherein said frictional member is adapted to transmit rotative efforts from said driving member to said torque-multiplying mechanism element, and wherein said speed-responsive means is responsive to the speed of said driven member.

31. In an automatic transmission, in subcombination, driving and driven members, a torque-multiplying mechanism normally interconnecting said members, a torque-multiplying part having a frictional face, an automatic plate, a reaction plate, resilient means normally urging said reaction member toward said part, means adapted to limit movement of said reaction member under the influence of said resilient means, friction means disposed between said part and said automatic plate; and speed-responsive means, adapted to act against said automatic plate and react against said reaction plate, for frictionally gripping said friction means between said part and said automatic plate when the latter attain a predetermined speed.

32. In an automatic transmission, in subcombination, a torque-multiplying mechanism, a member adapted to manifest retrograde rotative tendencies when forward rotative efforts are applied to said torque multiplying mechanism, means adapted to normally restrain said member against retrograde rotative tendencies, comprising a plurality of rollers disposed in recesses in said member and adapted to cooperate with the outer cylindrical surface of a normally stationary member.

33. In an automatic power transmitting mechanism, a housing; a driving member disposed in said housing and adapted to have rotational efforts imparted thereto; a driven member disposed in said housing and adapted to be coupled to a load; a gear mechanism mounted in said housing and operable to transmit a multiplied torque from said driving member to said driven member, said gear mechanism including a rotatably mounted pinion carrier having an axially extending sleeve portion; speed responsive means for automatically transmitting power directly from said driving member to said pinion carrier when certain predetermined conditions have been attained in the mechanism, said speed responsive means being axially spaced from said pinion carrier; and means, located between said pinion carrier and said speed responsive means and supported by said housing, for rotatably supporting the sleeve portion of said pinion carrier.

34. The automatic power transmitting mechanism described in claim 33, wherein said last named means comprises a partition element supported by said housing and disposed between said speed responsive means and said pinion carrier.

35. The automatic power transmitting mechanism described in claim 33, wherein said last named means defines a partition dividing said housing into two chambers, and wherein means are associated with the sleeve portion of said pinion carrier for substantially cutting off fluid communication between said chambers.

36. The automatic power transmitting mechanism described in claim 33, wherein said speed responsive means comprises an automatic clutch which is responsive to variations in the rotative speed of said pinion carrier.

37. In an automatic power transmitting mechanism, a driving member, an intermediate member, and a driven member arranged in series and adapted to transmit power from a prime mover to a load; torque multiplying means normally interconnecting said intermediate and driven members; means for automatically establishing a driving connection between said driving and intermediate members when said driving member attains a predetermined speed to thereby establish a torque multiplying connection between said driving and driven members, comprising an automatic clutch having resilient means tending to cause clutch engagement and means for releasably maintaining it disengaged against the action of the resilient means, whereby said clutch may be engaged independently of the speed of said driving member; and means for automatically bringing said driving and driven members into synchronism when certain conditions have been attained in the mechanism.

38. The automatic power transmitting mechanism described in claim 37, together with means for disengaging said automatic clutch against the action of said resilient means, whereby said driving and driven members may be disconnected at any time, regardless of whether a torque multiplying or a direct drive has been established between them.

39. In an automatic transmission, in sub-combination, a housing; partition means dividing said housing into a clutch chamber and a gear chamber; driving and driven members disposed in said housing, one of said members extending through said partition means; a torque varying mechanism disposed in said gear chamber and having an element extending through said partition means; and means for controlling said torque varying mechanism, comprising a clutch disposed in said clutch chamber and operably connected to said torque varying mechanism, said clutch being adapted to impart accelerating forces to said element; and the latter, when so accelerated, is adapted to cause said torque varying mechanism to tend to establish a direct drive between the driving and driven members.

40. The automatic transmission described in claim 39, wherein said clutch is automatically operable in response to variations in the speed of said element.

41. The automatic transmission described in claim 39, wherein said clutch is automatically operable in response to variations in the speed of said element, and is operable to transmit power from said driving member directly to said element when the latter attains a predetermined speed.

42. In an automatic transmission, in sub-combination, a housing; an apertured partition provided in said housing and dividing the latter into clutch and gear compartments; a shaft disposed in said housing and extending through said partition, said shaft having a sun gear mounted thereon; a clutch supporting member disposed in said housing and located in said clutch compartment and having a sleeve-like portion extending through said partition; a pinion carrier disposed in said housing and located in said gear compartment, said pinion carrier having pinions rotatably journalled therein which mesh with said sun gear; and means for rotatably supporting said clutch supporting member and said pinion carrier upon said partition.

43. The mechanism described in claim 42, wherein said clutch supporting member and said pinion carrier have portions which are disposed in telescoping relationship.

44. In an automatic transmission, a driving member, an intermediate member and a driven member disposed in series and operable to transmit power from a prime mover to a load; a torque multiplying mechanism operably associated with said intermediate and driven members and comprising a sun gear and a rotatably mounted pinion carrier, the latter rotatably supporting pinions which mesh with said sun gear; means for automatically establishing a slipping, power transmitting connection between said driving and intermediate members when said driving member attains a predetermined speed to thereby establish a torque multiplying connection between said driving and driven members through said torque multiplying mechanism, said means comprising a speed-responsive, disc-type, friction clutch having self-lubricated clutch facings, whereby the same may smoothly slip and transmit power over a substantial speed range of the prime mover; and means for automatically transmitting power from said intermediate member to said pinion carrier, to thereby establish a direct drive between said driving and driven members when certain conditions have been attained in the transmission.

45. The mechanism described in claim 44, wherein said pinions mesh with an orbital gear, and an overrunning clutch is associated with the latter for restraining it against rotation in one direction.

46. An automatic power transmitting mechanism comprising a driving member adapted to be operatively coupled to a prime mover; a driven member adapted to be coupled to a load; an intermediate member disposed in series with said driving and driven members and adapted to transmit power therebetween, a torque multiplying mechanism operably associated with said intermediate and driven members; means for establishing a slipping, power-transmitting coupling between said driving and driven members through said torque-multiplying mechanism when said driving member is accelerated to speeds in excess of a predetermined idling speed of said prime mover, and for maintaining said slipping coupling throughout at least a substantial speed range of said driving member, thereby allowing said prime mover to accelerate sufficiently to develop adequate torque to accelerate said load, and means for automatically bringing said intermediate and driven members into direct drive when certain parts of said torque multiplying mechanism have attained a predetermined speed in response to said prime mover attaining a speed sufficiently high to handle said load without the aid of said torque multiplying mechanism, said torque multiplying mechanism having a torque multiplication of such magnitude that when the transition from torque multiplying to direct drive is initiated, said driving and driven members are rotating at speeds which are not greatly variant.

JOSEPH E. PADGETT.